či US009223543B2

(12) United States Patent
Mogi et al.

(10) Patent No.: US 9,223,543 B2
(45) Date of Patent: Dec. 29, 2015

(54) ARITHMETIC UNIT, PROCESSOR, COMPILER AND COMPILING METHOD

(75) Inventors: Yukihiko Mogi, Kanagawa (JP); Masato Kamata, Tokyo (JP); Yuki Kawaguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 1416 days.

(21) Appl. No.: 12/651,532

(22) Filed: Jan. 4, 2010

(65) Prior Publication Data

US 2010/0180268 A1 Jul. 15, 2010

(30) Foreign Application Priority Data

Jan. 9, 2009 (JP) ................. 2009-003018

(51) Int. Cl.
*G06F 9/45* (2006.01)
*G06F 7/485* (2006.01)
*G06F 7/483* (2006.01)

(52) U.S. Cl.
CPC ............. *G06F 7/483* (2013.01); *G06F 8/443* (2013.01); *G06F 2207/3824* (2013.01)

(58) Field of Classification Search
CPC .. G06F 7/483; G06F 8/443; G06F 2207/3824
USPC ........................................................ 717/140
See application file for complete search history.

(56) References Cited

U.S. PATENT DOCUMENTS

| 5,931,943 | A * | 8/1999 | Orup ............................. 712/222 |
| 2002/0042801 | A1* | 4/2002 | Sazzad ......................... 708/200 |
| 2003/0041081 | A1* | 2/2003 | Steele, Jr. ..................... 708/495 |
| 2003/0236651 | A1* | 12/2003 | Miyasaka et al. ................. 703/2 |
| 2005/0065990 | A1* | 3/2005 | Allen ............................ 708/495 |
| 2010/0153938 | A1* | 6/2010 | Arimilli et al. ............... 717/151 |

FOREIGN PATENT DOCUMENTS

| JP | 2001-256199 A | 9/2001 |
| JP | 2005-031847 A | 2/2005 |
| JP | 2006-154979 A | 6/2006 |

* cited by examiner

*Primary Examiner* — Idriss N Alrobaye
*Assistant Examiner* — Brooke Taylor
(74) *Attorney, Agent, or Firm* — Sony Corporation

(57) ABSTRACT

An arithmetic unit which includes: a data supply section which supplies floating-point type object data to which a sign is to be added and condition data which includes a condition under which the sign is added; a sign data generating section which extracts the condition included in the condition data and generates sign data for adding the sign to the object data on the basis of the extracted condition; and an integer arithmetic operation section which performs an integer arithmetic operation while treating the object data as integer type data so as to add the sign to the object data on the basis of the sign data and the object data.

14 Claims, 29 Drawing Sheets

ARITHMETIC UNIT, PROCESSOR, COMPILER AND COMPILING METHOD

BACKGROUND OF THE INVENTION

1. Field of the Invention

The present invention relates to an arithmetic unit. Mare particularly, the invention relates to an arithmetic unit, a processor, a compiler and a compiling method for performing a floating-point arithmetic operation and an integer arithmetic operation.

2. Description of the Related Art

Real numbers are represented as, for example, integer type (i.e., fixed-point type) data and floating-point type data in an information processing device, such as a computer. In order to change the sign of floating-point type data, a floating-point arithmetic unit dedicated to performing arithmetic operations on floating-point type data has been used. Recently, there is a demand for a device that converts the sign of floating-point type data at higher speed. In order to meet such a demand, an arithmetic unit that performs integer arithmetic operations in which floating-point type data is treated as unsigned integer type data has been proposed (see, for example, FIG. 1 of Japanese Unexamined Patent Application, First Publication No. 2005-31847). The arithmetic unit performs an integer arithmetic operation while treating floating-point type data as unsigned integer type data so that only a sign bit representing the sign of floating-point type data is changed into a bit value which represents a positive number.

SUMMARY OF THE INVENTION

In the related art described above, the sign bit of floating-point type data can be converted into a sign bit representing a positive value at high speed through an integer arithmetic operation while treating floating-point type data as unsigned integer type data. In such an arithmetic unit, however, all the sign bits in floating-point type data are converted into sign bits that represent positive values. It is therefore not possible to convert the sign bits in floating-point type data under other conditions.

It is desirable to convert signs of floating-point type data at high speed on the basis of condition data.

A first embodiment of the invention is an arithmetic unit which includes: a data supply section which supplies floating-point type object data to which a sign is to be added and condition data which includes a condition under which the sign is added; a sign data generating section which extracts the condition included in the condition data and generates sign data for adding the sign to the object data on the basis of the extracted condition; and an integer arithmetic operation section which performs an integer arithmetic operation while treating the object data as integer type data so as to add the sign to the object data on the basis of the sign data and the object data. With this configuration, the sign can be added to the object data through the integer arithmetic operation on the basis of the floating-point type object data to which a sign is to be added and the condition data which includes the condition under which the sign is added.

In the first embodiment, the sign data generating section may perform the integer arithmetic operation while treating the condition data as the integer type data if the condition data is floating-point type data. With this configuration, the sign data can be generated in an integer arithmetic unit on the basis of the floating-point type data.

In the first embodiment, the sign data generating section may include a bit string holding section which holds a bit string for extracting the condition and the sign data generating section may extract the condition from the condition data using the bit string. With this configuration, the condition can be extracted on the basis of the bit string for extracting the condition.

In the first embodiment, the sign data generating section may generate new condition data on the basis of a plurality of pieces of the condition data supplied from the data supply section, extract the condition included in the new condition data and generate the sign data on the basis of the extracted condition. With this configuration, new condition data can be generated on the basis of plural condition data so as to generate the sign data.

In the first embodiment, the sign data generating section may extract the plurality of conditions included in the plurality of pieces of condition data on the basis of the plurality of pieces of the condition data supplied from the data supply section and generate the sign data on the basis of the plurality of the extracted conditions. With this configuration, the sign data can be generated on the basis of the plural conditions generated from the plural condition data.

In the first embodiment, the sign data generating section may supply the bit string supplied from the bit string holding section to a sign calculating section as the sign data irrespective of a value of the condition data and the integer arithmetic operation section may invert the sign of the object data on the basis of the sign data. With this configuration, the sign of the object data can be inverted irrespective of the value of the condition data.

In the first embodiment, the sign data generating section may extract, as the condition, the sign bit which is a bit representing the sign in the condition data and generate the sign data on the basis of the extracted sign bit. With this configuration, the sign data can be generated on the basis of the sign bit in the condition data.

In the first embodiment, the sign data generating section may extract the sign bit which is the bit representing the sign in the condition data as the condition, invert the sign of the extracted sign bit to generate a new sign bit and then generate the sign data on the basis of the new sign bit. With this configuration, the sign data can be generated on the basis of the sign bit with an inverted sign bit in the condition data.

In the first embodiment, the sign data generating section may shift the sign bit which is the bit representing the sign in the condition data so that a position of the sign in the sign data and a position of the sign in the object data are aligned with each other in the integer arithmetic operation section. With this configuration, the position of the sign bit of the sign data and the position of the sign bit of the object data can be aligned with each other.

A second embodiment of the invention is a processor which includes: a register which supplies floating-point type object data to which a sign is to be added and condition data which includes a condition under which the sign is added; a sign data generating section which extracts the condition included in the condition data and generates sign data for adding the sign to the object data on the basis of the extracted condition; and an integer arithmetic operation section which performs an integer arithmetic operation while treating the object data as integer type data so as to add the sign to the object data on the basis of the sign data and the object data. With this configuration, the sign can be added to the object data through the integer arithmetic operation with the processor on the basis of the floating-point type object data to which a sign is to be added and the condition data which includes the condition under which the sign is added.

A third embodiment of the invention is a compiler and a method therefor. The compiler includes: a source program storage section which stores a source program that includes a code for adding a sign to object data on the basis of floating-point type object data to which the sign is to be added and condition data which includes a condition under which the sign is added; a sign addition code extraction section which reads the source program out of the source program storage section and extracts the code from the read source program; a sign addition code generating section which generates a code for extracting the condition included in the condition data and generate sign data for adding the sign to the object data on the basis of the extracted condition and a code for performing an integer arithmetic operation while treating the object data as integer type data and add the sign to the object data on the basis of the sign data and the object data; a sign addition code converting section which converts the extracted code into the generated code; and a code generating section which generates a machine language program code on the basis of the source program including the converted code. With this configuration, the code for adding the sign to the object data on the basis of the object data and the condition data can be converted into the code for generating the sign data and the code for adding the sign to the object data.

According to the invention, an advantageous effect is exhibited that the sign of floating-point type data can be converted at high speed on the basis of the condition data.

DESCRIPTION OF THE EMBODIMENTS

Hereinafter, the best mode (hereinafter, referred to as "embodiments") for implementing the invention will be described. Description will be given in the following order.

1. First Embodiment (Sign Addition Process Control: Example of Processor)
2. Second Embodiment (Mp3 Data Decoding Control: Example of Decoding Device)
3. Third Embodiment (Sign Addition Process Control: Example of Processor Including Integer Register and Floating-Point Register)
4. Fourth Embodiment (Compiling Control: Example of Compiling System)

1. First Embodiment

Example of Floating-Point Number Format

Figure 1A:
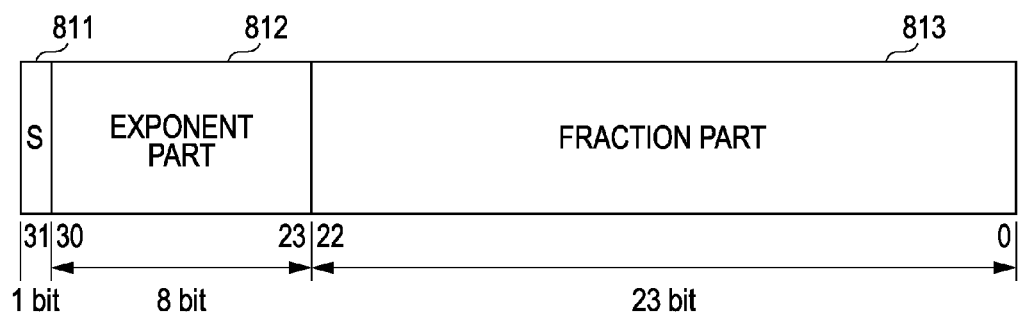
FIG. 1A is a schematic diagram illustrating an exemplary floating-point number format employed in an embodiment of the invention.
Figure 1B:
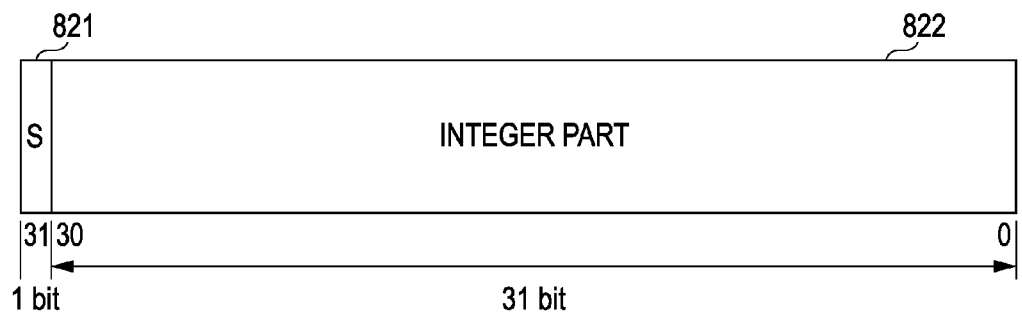
FIG. 1B is a schematic diagram illustrating an exemplary integer format employed in an embodiment of the invention.

FIG. 1A is a schematic diagram illustrating an exemplary floating-point number format employed in an embodiment of the invention. FIG. 1B is a schematic diagram illustrating an exemplary integer format employed in an embodiment of the invention. FIG. 1A illustrates a format of single-precision floating-point number data. FIG. 1B illustrates a format of integer type data. The left end of each format represents the most significant bit (MSB) and the right end represents the least significant bit (LSB).

FIG. 1A illustrates a format representing single-precision floating-point number data on the basis of the Institute for Electrical and Electronics Engineering (IEEE) 754 standard. The single-precision floating-point number is represented by a bit string constituted by 32 bits (i.e., 0th to 31st bits). The floating-point type data is constituted by a sign bit 811 which represents a sign, an exponent part 812 which represents exponents and a mantissa part 813 which represents mantissas.

The sign bit 811 represents the sign of the floating-point number. The sign bit 811 is the 31st, the most significant bit. The sign bit 811 represents positive if the 31st bit is "0" and represents negative if the 31st bit is "1."

The exponent part 812 is a bit string which represents a value obtained by adding "127" as a bias component to the exponent for exponentiation with a number base of 2. The exponent part 812 is the 23rd to 30th bits in the bit string.

The mantissa part 813 is a bit string which represents a value not greater than 1 obtained by subtracting "1" from the mantissa in the binary decimal. The mantissa part 813 is the 0th to 22nd bits in the bit string.

The thus-configured floating-point number can be represented by the following Equation (1):

$$(-1)^S \times 2^{(E-B)} \times (1+.F) \quad (1)$$

wherein S is a value represented by the sign bit 811, E is a value represented by the exponent part 812 and B is a bias component and F is a value represented by the mantissa part 813.

FIG. 1B is an integer type data format. As an example, integer type data represented by a bit string constituted by 32 bits (i.e., 0th to 31st bits) is illustrated. The integer type data is constituted by a sign bit (S) 821 and an integer part 822.

The sign bit 821 represents a sign of the integer type data. The sign bit 821 is the 31st, the most significant bit. The sign bit 821 represents positive if the 31st bit is "0" and represents negative if the 31st bit is "1."

The integer part 822 is constituted by a bit string other than the sign bit 821 of the integer type data. If the sign bit 821 is positive, the integer part 822 is represented by the binary numeration system. If the sign bit 821 is negative, the integer part 822 is represented by the two's complement of the binary number. The two's complement herein is a bit string obtained by inverting a bit string in which an absolute value is represented by a binary number and adding "1" to the least significant bit of the inverted bit string. The integer part 822 corresponds to the 0th to the 30th bits.

The processor 100 which processes the thus-configured floating-point type data and integer type data will be described in detail with reference to the drawings.

First Exemplary Configuration of Processor

Figure 2:
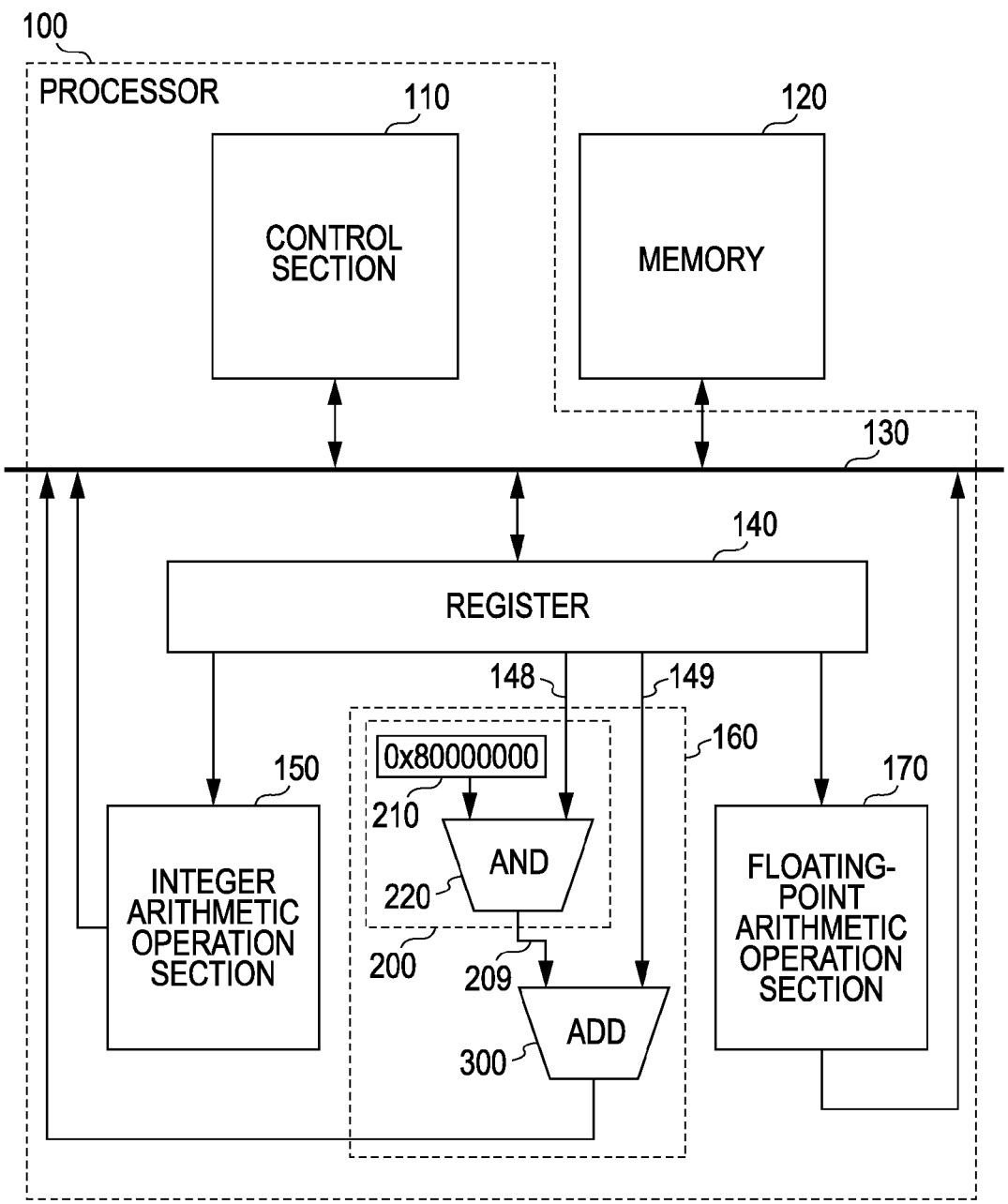
FIG. 2 is a block diagram of a first exemplary configuration of a processor 100 according to a first embodiment of the invention.

FIG. 2 is a block diagram of a first exemplary configuration of a processor 100 according to a first embodiment of the invention. FIG. 2 illustrates the processor 100 and the memory 120. The processor 100 processes the floating-point type object data to which the sign is to be added and the 32-bit integer type condition data including the condition under which the sign is added. The processor 100 includes a control section 110, a bus 130, a register 140, an integer arithmetic operation section 150, a sign determining section 160 and a floating-point arithmetic operation section 170.

The control section 110 controls components of the processor 100. The control section 110 is implemented by, for example, a central processing unit (CPU). The control section 110 instructs, for example, data transfer from the register 140 to the sign determining section 160 and data transfer from the sign determining section 160 to the register 140.

The bus 130 is used for data communication among the components of the processor 100.

The register 140 temporarily keeps data necessary for the arithmetic operation in the integer arithmetic operation section 150, the sign determining section 160 and the floating-point arithmetic operation section 170. The register 140 temporarily keeps results of the arithmetic operation in the integer arithmetic operation section 150, the sign determining section 160 and the floating-point arithmetic operation section 170. The register 140 is configured by, for example, a flip-flop. The register 140 temporarily keeps the object data and the condition data supplied from the memory 120 via the bus 130. The register 140 temporarily keeps results of processing in the sign determining section 160. The register 140 supplies the temporarily kept object data to the sign determining section 160 via the signal line 149. The register 140 supplies the temporarily kept condition data to the sign determining section 160 via the signal line 148. The register 140 is an example of the data supply section and the register recited in the claims.

The integer arithmetic operation section 150 performs integer arithmetic operation on the basis of the integer type data supplied from the register 140. The integer arithmetic operation section 150 is implemented by, for example, an arithmetic logic unit (ALU) of a CPU in a common computer. The integer arithmetic operation section 150 supplies results of the integer arithmetic operation to the register 140 via the bus 130.

The sign determining section 160 adds a sign to the object data on the basis of the object data and the condition data supplied from the register 140. The sign determining section 160 includes a sign data generating section 200 and a sign adding section 300.

The sign data generating section 200 generates sign data for adding the sign to floating-point type data on the basis of a condition included in the condition data. The sign data generating section 200 supplies the generated sign data to the sign adding section 300. The sign data generating section 200 includes a bit string holding section 210 and a sign bit extraction section 220. The sign data generating section 200 is an exemplary sign data generating section recited in the claims.

The bit string holding section 210 keeps a bit string for extracting the sign bit from the condition data. The bit string holding section 210 keeps, for example, a bit string of "0x80000000" of the hexadecimal number if the condition data is 32-bit data. The bit string holding section 210 supplies the currently kept bit string to the sign bit extraction section

220. The bit string holding section 210 is an exemplary bit string holding section recited in the claims.

The sign bit extraction section 220 extracts, as a condition, the sign bit representing the sign in the condition data on the basis of the condition data supplied from the register 140 and the bit string supplied from the bit string holding section 210. The sign bit extraction section 220 is implemented by, for example, an AND operation circuit. The sign bit extraction section 220 supplies the extracted sign bit to the sign adding section 300 as the sign data.

The sign adding section 300 adds the sign to the object data on the basis of the object data supplied from the register 140 and the sign data supplied from the sign determining section 160. The sign adding section 300 processes the object data as integer type data and adds the sign to the object data through the integer arithmetic operation on the object data and the sign data, which is the integer type data. The sign adding section 300 is implemented by, for example, the integer arithmetic operation circuit which performs arithmetic addition (ADD). The sign adding section 300 supplies the signed object data to the register 140. Although the integer arithmetic operation circuit which performs an arithmetic addition (ADD) operation has been described as the sign adding section 300, the sign adding section 300 is not limited to the same. Any circuit can be employed as long as it converts the sign bit on the basis of the sign data. For example, the sign adding section 300 may be an exclusive OR (XOR) circuit. The sign adding section 300 is an exemplary integer arithmetic operation section recited in the claims.

The floating-point arithmetic operation section 170 performs a floating-point arithmetic operation on the basis of floating-point type data supplied from the register 140. The floating-point arithmetic operation section 170 is implemented by, for example, a floating-point number processing unit (FPU) of the CPU in a common computer. The floating-point arithmetic operation section 170 performs the floating-point arithmetic operation on the basis of, for example, the 32-bit floating-point type data supplied from the register 140. The floating-point arithmetic operation section 170 supplies, for example, the result of the floating-point arithmetic operation to the register 140 via the bus 130. Although the processor 100 including the register 140 has been described above, the sign determining section 160 may alternatively be an independent computation section. Although the integer type data is employed herein as the condition data, floating-point type data may alternatively be employed as the condition data, which may be used as the integer type data when the sign code is generated.

The memory 120 keeps the data necessary for the operation of the processor 100. The memory 120 keeps, for example, the floating-point type object data to which the sign is to be added in the sign determining section 160 and the condition data which includes the conditions under which the sign is added to the object data. The memory 120 supplies the data necessary for the operation of the processor 100 to the processor 100 via the bus 130.

In this configuration, it is assumed that the sign is added to the object data on the basis of the condition data in which the sign bit of the integer type data represents "1" and the object data in which the sign bit of floating-point type data represents "1."

The sign bit extraction section 220 extracts the sign bit 821 from the condition data through the logical product (AND) arithmetic operation on the basis of the condition data supplied via the signal line 148 and the bit string supplied from the bit string holding section 210. In this manner, the sign data in which the sign bit 821 is "1" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the sign bit extraction section 220. In this manner, "1" of the sign bit 821 is added to "1" of the sign bit 811 to generate the object data in which the sign bit 811 is converted into "0." The exponent part 812 and the mantissa part 813 are not converted at this time. If the sign bit of the condition data is "1" and the sign bit 811 of the object data is "0," the sign bit 811 is converted from "0" into "1" and, the exponent part 812 and the mantissa part 813 are not converted.

In this configuration, it is assumed that the sign is added to the object data on the basis of the condition data in which the sign bit of the integer type data represents "0" and the object data in which the sign bit of the single-precision floating-point type data represents "1."

The sign bit extraction section 220 extracts the sign bit 821 from the condition data through the logical product (AND) arithmetic operation on the basis of the condition data supplied via the signal line 148 and the bit string supplied from the bit string holding section 210. The sign data in which the sign bit 821 is "0" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the sign bit extraction section 220. Accordingly, "0" is added to "1" of the sign bit 811 to generate the object data in which the sign bit 811 is not converted. If the sign bit of the condition data is "0" and the sign bit of object data is "0," since "0" of the sign bit 821 is added to "0" of the sign bit 811, the object data in which the sign bit 811 is not converted is generated.

Next, an operation of the processor 100 of a first exemplary configuration of the processor 100 according to the first embodiment of the invention will be described with reference to the drawings.

Figure 3:
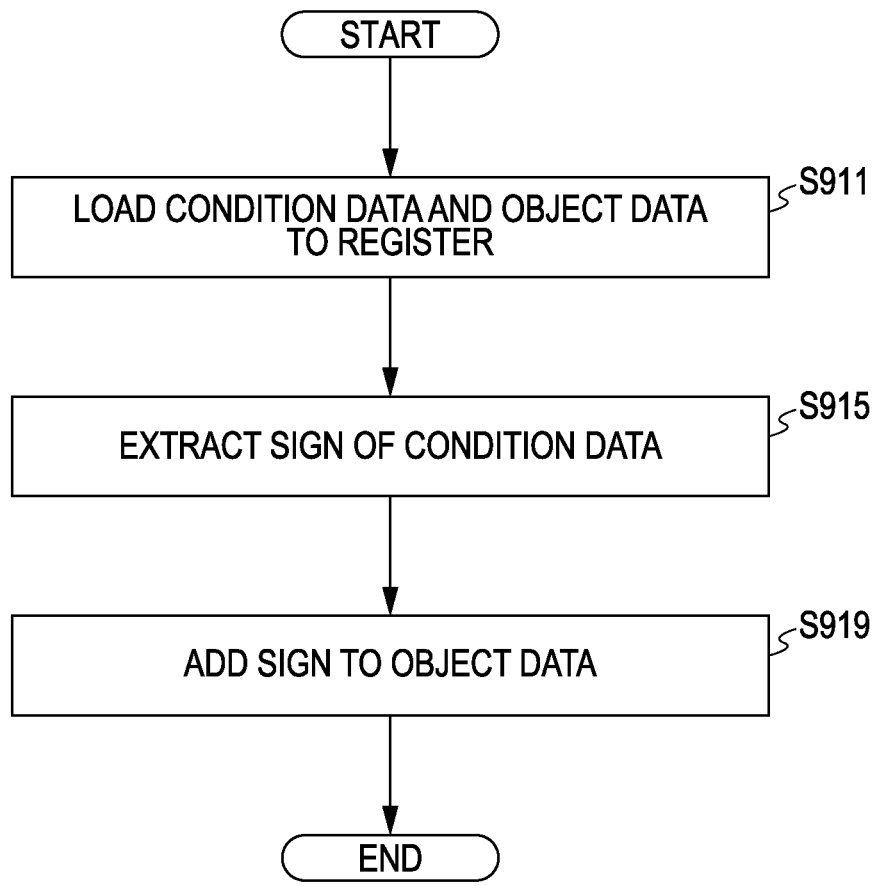
FIG. 3 is a flowchart illustrating exemplary steps in a sign addition process in the first exemplary configuration of the processor 100 according to the first embodiment of the invention.

FIG. 3 is a flowchart illustrating exemplary steps in a sign addition process in the first exemplary configuration of the processor 100 according to the first embodiment of the invention.

First, the condition data and the object data are loaded into the register 140 from the memory 120 (step S911). Next, the sign bit extraction section 220 extracts the sign bit of the condition data (step S915). Subsequently, the sign adding section 300 adds the sign to the object data (step S919).

Since the processor 100 includes the sign determining section 160, the processor 100 can add the sign to the object data on the basis of the condition data and the object data. That is, since the bit string holding section 210 and the sign bit extraction section 220 are provided in the sign determining section 160, the processor 100 can convert the sign of the object data if the sign bit of the condition data is "1."

Second Exemplary Configuration of Processor

Figure 4:
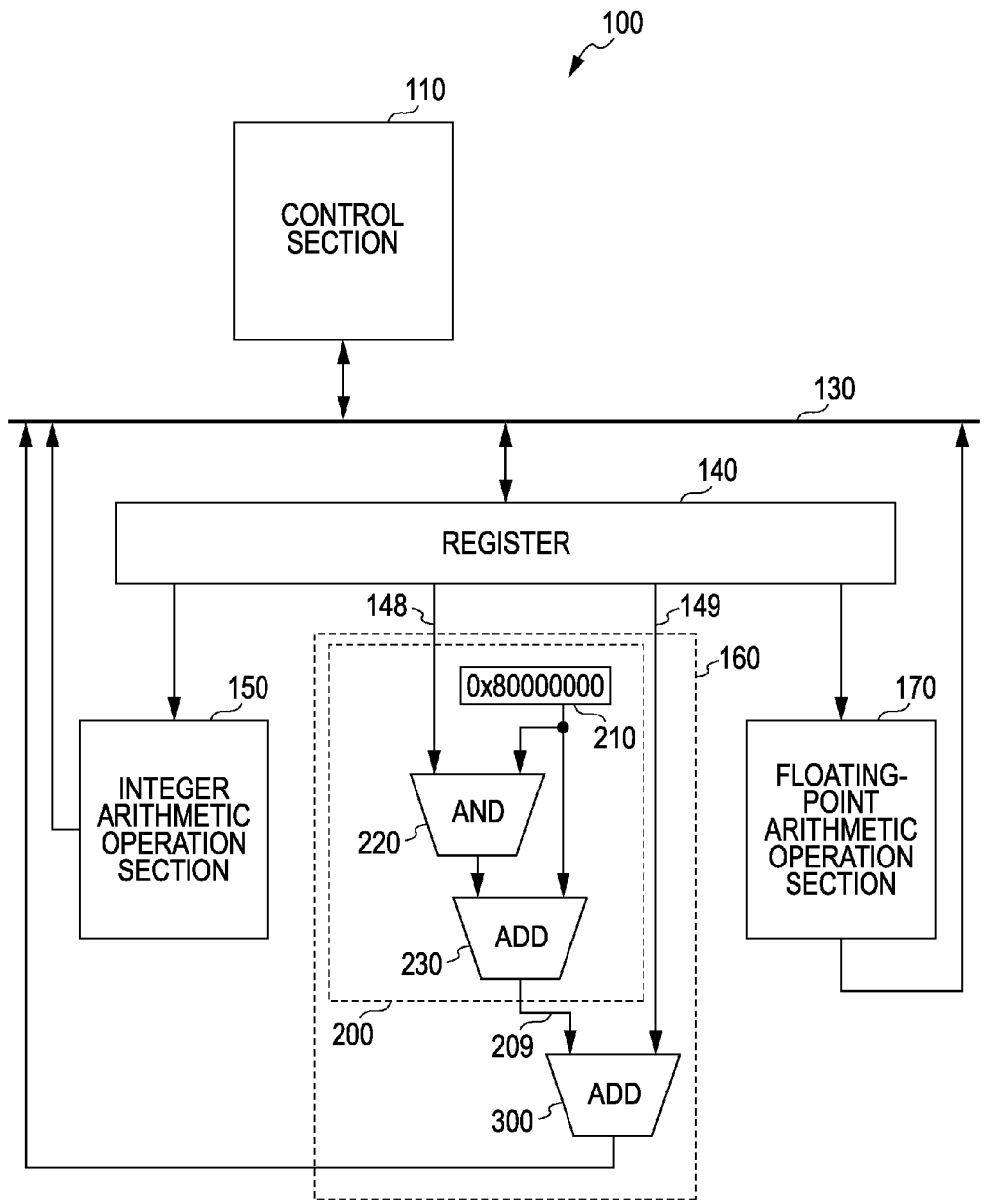
FIG. 4 is a block diagram of a second exemplary configuration of the processor 100 according to the first embodiment of the invention.

FIG. 4 is a block diagram of a second exemplary configuration of the processor 100 according to the first embodiment of the invention. The present processor 100 is the same as that illustrated in FIG. 2 except that an inverting section 230 is included. Since the present processor 100 has the same configuration as that illustrated in FIG. 2 except for the inverting section 230, similar components will be denoted by similar reference numerals and description thereof will be omitted. The sign data generating section 200 illustrated in FIG. 4 is an exemplary sign data generating section recited in the claims.

The inverting section 230 inverts the sign bit supplied from the sign bit extraction section 220 on the basis of the bit string supplied from the bit string holding section 210. The inverting section 230 is implemented by, for example, the integer arithmetic operation circuit which performs the arithmetic addition (ADD) operation. The inverting section 230 supplies the sign-inverted sign bit to the sign adding section 300 as the sign data. Although the inverted section 230 has been described as being an integer arithmetic operation circuit which performs the arithmetic addition (ADD) operation, the inverting section 230 is not limited to this. Any circuit can be employed as long as it converts only the sign bit on the basis of the sign data. For example, the inverting section 230 may be a circuit which performs an exclusive OR (XOR) operation.

In this configuration, it is assumed that the sign is added to the object data on the basis of the condition data in which the sign bit of the integer type data represents "0" and the object data in which the sign bit of floating-point type data represents "1."

The sign bit extraction section 220 extracts the sign bit 821 from the condition data through the logical product (AND) arithmetic operation on the basis of the condition data supplied via the signal line 148 and the bit string supplied from the bit string holding section 210. Accordingly, the data with the bit representing the sign bit being "0" and all other bits being "0" is generated. The inverting section 230 then performs the arithmetic addition (ADD) operation on the basis of the data supplied from the sign bit extraction section 220 and the bit string supplied from the bit string holding section 210. The inverting section 230 inverts the bit which represents the sign bit of the condition data of the data supplied from the sign bit extraction section 220. In this manner, the sign data in which the sign bit 821 is "1" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the inverting section 230. In this manner, "1" of the sign bit 821 is added to "1" of the sign bit 811 to generate the object data in which the sign bit 811 is converted into "0." The exponent part 812 and the mantissa part 813 are not converted at this time. If the sign bit of the condition data is "0" and the sign bit 811 of the object data is "0," the sign bit 811 is converted from "0" into "1" and, the exponent part 812 and the mantissa part 813 are not converted.

In this configuration, it is assumed that the sign is added to the object data on the basis of the condition data in which the sign bit of the integer type data is "1" and the object data in which the sign bit of the single-precision floating-point type data is "1."

The sign bit extraction section 220 extracts the sign bit 821 from the condition data through the logical product (AND) arithmetic operation on the basis of the condition data supplied via the signal line 148 and the bit string supplied from the bit string holding section 210. Accordingly, the data in which the bit representing the sign bit is "1" and all other bits are "0" is generated. The inverting section 230 then performs the arithmetic addition (ADD) operation on the basis of the data supplied from the sign bit extraction section 220 and the bit string supplied from the bit string holding section 210. The inverting section 230 inverts the bit which represents the sign bit of the condition data of the data supplied from the sign bit extraction section 220. In this manner, the sign data in which the sign bit 821 is "0" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the inverting section 230. Accordingly, "0" is added to "1" of the sign bit 811 to generate the object data in which the sign bit 811 is not converted. If the sign bit of the condition data is "1" and the sign bit of object data is "0," since "0" of the sign bit 821 is added to "0" of that sign bit 811, the object data in which the sign bit 811 is not converted is generated.

Next, an operation of the processor 100 of a second exemplary configuration of the processor 100 according to the first embodiment of the invention will be described with reference to the drawings.

Figure 5:
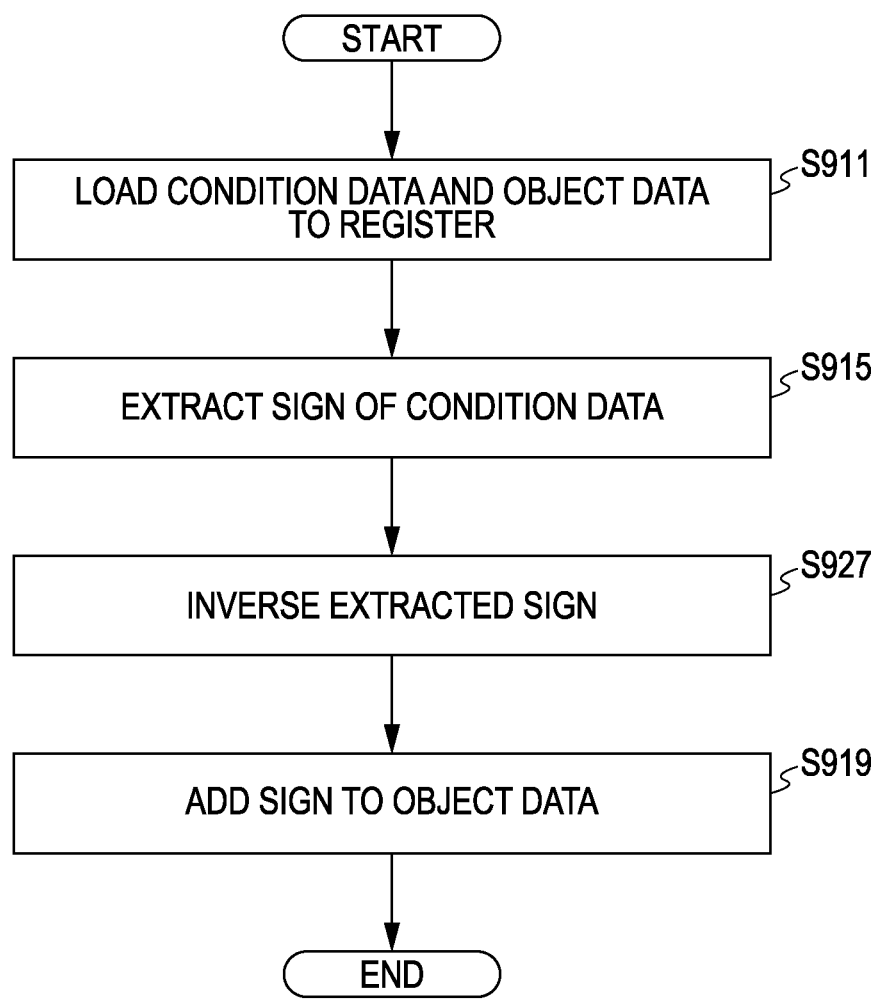
FIG. 5 is a flowchart illustrating exemplary steps in a sign addition process in the second exemplary configuration of the processor 100 according to the first embodiment of the invention.

FIG. 5 is a flowchart illustrating exemplary steps in a sign addition process in the second exemplary configuration of the processor 100 according to the first embodiment of the invention.

First, the condition data and the object data are loaded into the register 140 from the memory 120 (step S911). Next, the sign bit extraction section 220 extracts the sign bit of the condition data (step S915). The inverting section 230 then inverts the extracted sign bit (step S927). Subsequently, the sign adding section 300 adds the sign to the object data (step S919).

Since the processor 100 includes the inverting section 230, the sign of the object data can be converted if the sign bit of the condition data is "0."

Third Exemplary Configuration of Processor

Figure 6:
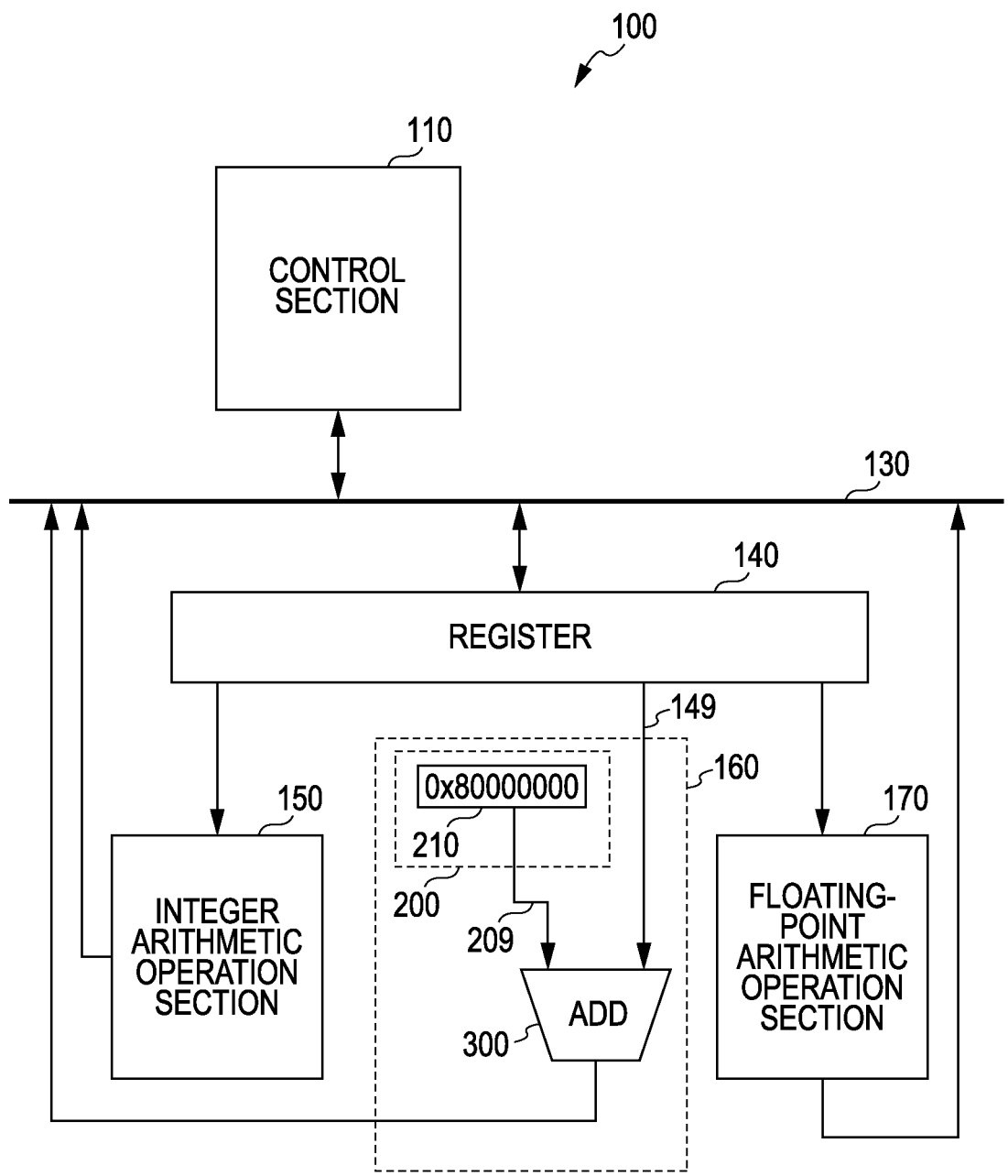
FIG. 6 is a block diagram illustrating a third exemplary configuration of the processor 100 according to the first embodiment of the invention.

FIG. 6 is a block diagram illustrating a third exemplary configuration of the processor 100 according to the first embodiment of the invention. The present processor 100 is the same as that illustrated in FIG. 2 except that a sign data generating section 200 is included. Since the present processor 100 has the same configuration as that illustrated in FIG. 2 except for the sign data generating section 200, similar components will be denoted by similar reference numerals and description thereof will be omitted. The sign data generating section 200 illustrated in FIG. 6 is an exemplary sign data generating section recited in the claims.

The sign data generating section 200 includes the bit string holding section 210 illustrated in FIG. 2. The bit string holding section 210 supplies the currently kept bit string to the sign adding section 300 irrespective of the value of the condition data.

In this configuration, it is assumed that the sign is added to the object data on the basis of the condition data in which the sign bit of the integer type data represents "0" or "1" and the object data in which the sign bit of floating-point type data represents "1."

In this case, the bit string holding section 210 supplies the currently kept bit string to the sign adding section 300 irrespective of the value of the condition data. In this manner, the sign data in which the sign bit 821 is "1" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the bit string holding section 210. In this manner, "1" of the sign bit 821 is added to "1" of the sign bit 811 to generate the object data in which the sign bit 811 is converted into "0." The exponent part 812 and the mantissa part 813 are not converted at this time. If the sign bit 811 of the object data is "0," the sign bit 811 is converted from "0" into "1" and, the exponent part 812 and the mantissa part 813 are not converted.

Next, an operation of the processor 100 of a third exemplary configuration of the processor 100 according to the first embodiment of the invention will be described with reference to the drawings.

Figure 7:
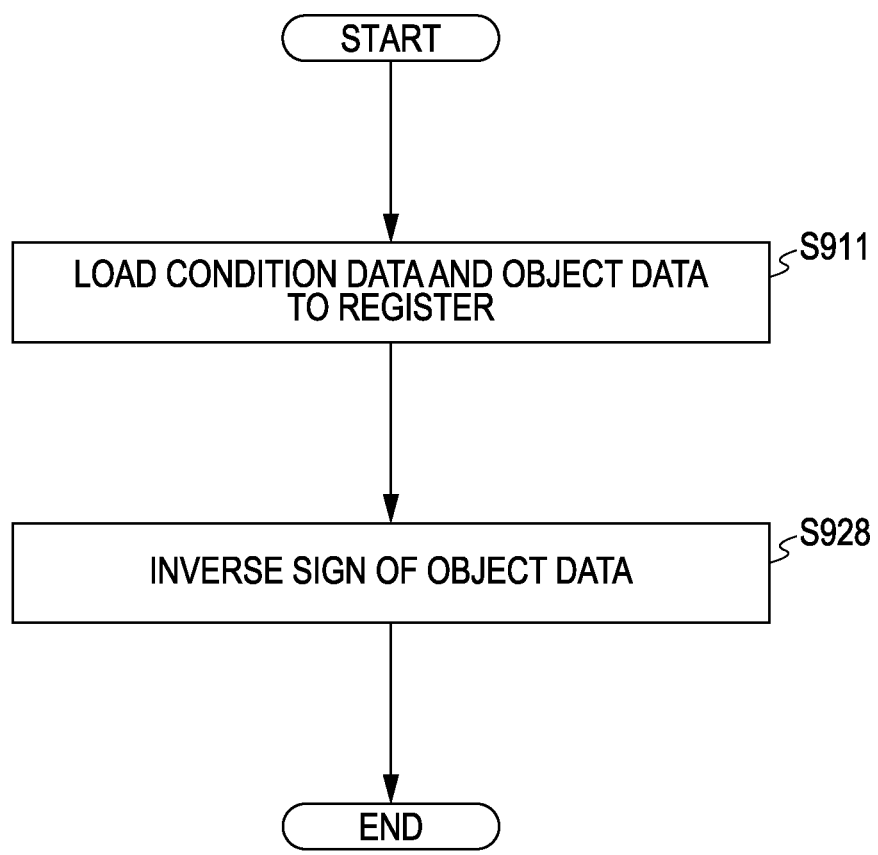
FIG. 7 is a flowchart illustrating exemplary steps in a sign addition process in the third exemplary configuration of the processor 100 according to the first embodiment of the invention.

FIG. 7 is a flowchart illustrating exemplary steps in a sign addition process in the third exemplary configuration of the processor 100 according to the first embodiment of the invention.

First, the condition data and the object data are loaded into the register 140 from the memory 120 (step S911). Next, the sign adding section 300 inverts the sign bit of the object data (step S928).

Since the processor 100 includes the bit string holding section 210 and the sign adding section 300 in the sign determining section 160, the sign of the object data can be converted irrespective of the value of the condition data.

Fourth Exemplary Configuration of Processor

Figure 8:
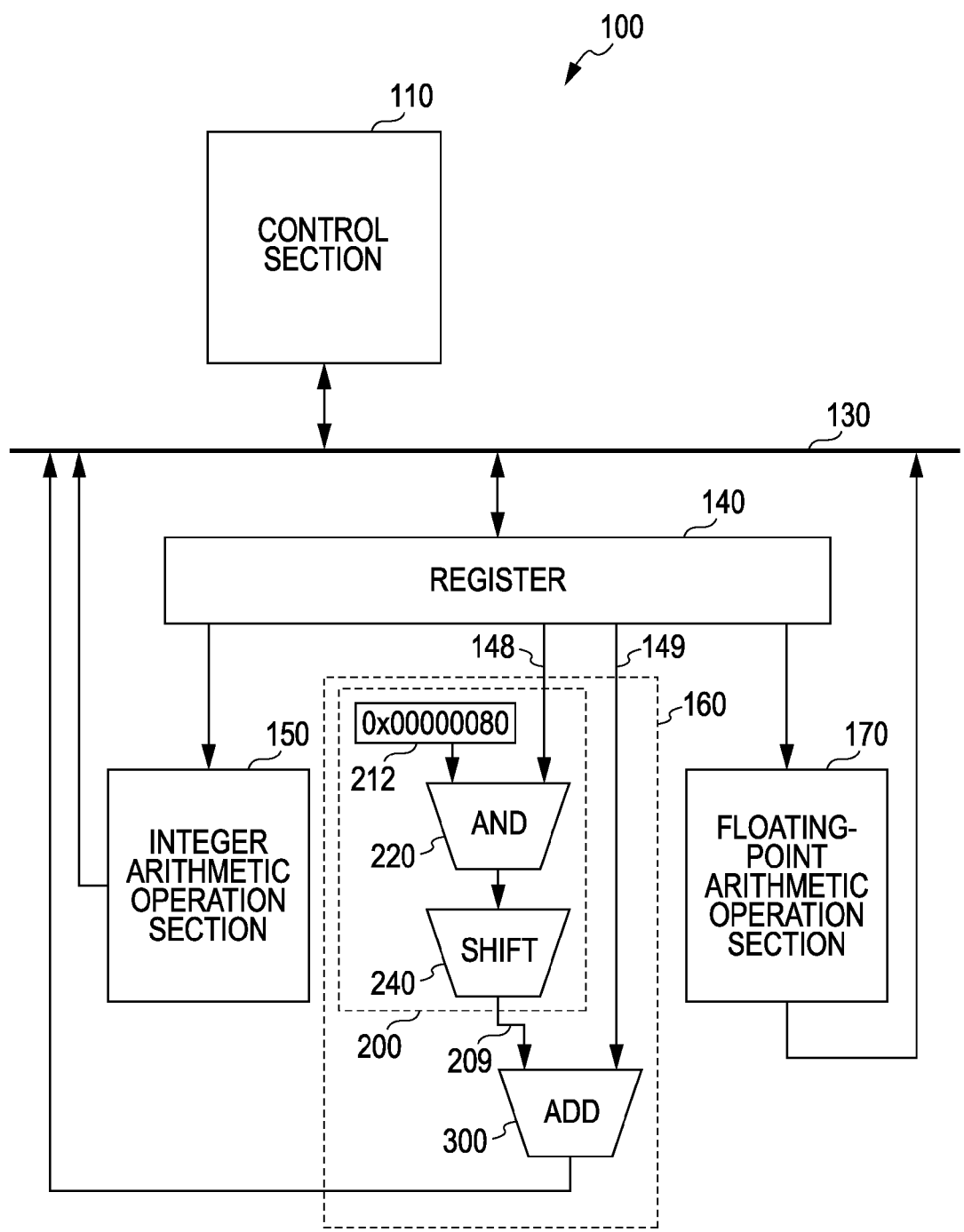
FIG. 8 is a block diagram illustrating a fourth exemplary configuration of the processor 100 according to the first embodiment of the invention.

FIG. 8 is a block diagram illustrating a fourth exemplary configuration of the processor 100 according to the first embodiment of the invention. The present processor 100 is the same as that illustrated in FIG. 2 except that a bit string holding section 212 and the shift section 240 are included in place of the bit string holding section 210. Since the present processor 100 has the same configuration as that illustrated in FIG. 2 except for the bit string holding section 212 and the shift section 240, similar components will be denoted by similar reference numerals and description thereof will be omitted. The sign data generating section 200 illustrated in FIG. 8 is an exemplary sign data generating section recited in the claims.

The bit string holding section 212 keeps a bit string of "0x00000080" of the hexadecimal number for extracting the sign bit from the 8-bit length condition data. The bit string holding section 212 is an exemplary bit string holding section recited in the claims.

If the condition data and the object data have different bit lengths, the shift section 240 shifts the sign bit extracted from the condition data in order to align the position of the sign bit with the position of the sign bit of the condition data in the sign adding section 300. In particular, for example, if the 8-bit condition data is supplied via the signal line 148 and the sign bit is extracted in the sign bit extraction section 220, the shift section 240 shifts the extracted sign bit to the left by 24 bits. The shift section 240 shifts the sign bit supplied from the sign bit extraction section 220 and supplies the shifted sign bit to the sign adding section 300 as the sign data.

In this configuration, it is assumed that the sign is added to the object data on the basis of the 8-bit condition data in which the sign bit of the integer type data represents "1" and the 32-bit object data in which the sign bit of floating-point type data represents "1."

The sign bit extraction section 220 extracts the sign bit 821 from the condition data through the logical product (AND) arithmetic operation on the basis of the condition data supplied via the signal line 148 and the bit string supplied from the bit string holding section 212. Accordingly, the data is generated in which the 7th bit representing the sign bit of the condition data is "1" and all other bits are "0." Then, the shift section 240 shifts the data supplied from the sign bit extraction section 220 to the left by 24 bits. In this manner, the sign data in which the sign bit 821 is "1" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the shift section 240. In this manner, "1" of the sign bit 821 is added to "1" of the sign bit 811 to generate the object data in which the sign bit 811 is converted into "0." The exponent part 812 and the mantissa part 813 are not converted at this time. If the sign bit of the condition data is "1" and the sign bit 811 of the object data is "0," the sign bit 811 is converted from "0" into "1" and, the exponent part 812 and the mantissa part 813 are not converted.

In this configuration, it is assumed that the sign is added to the object data on the basis of the 8-bit condition data in which the sign bit of the integer type data represents "0" and the 32-bit object data in which the sign bit of floating-point type data represents "1."

The sign bit extraction section 220 extracts the sign bit 821 from the condition data through the logical product (AND) arithmetic operation on the basis of the condition data supplied via the signal line 148 and the bit string supplied from the bit string holding section 212. Accordingly, the data is generated in which the 7th bit representing the sign bit of the condition data is "0" and all other bits are "0." Then, the shift section 240 shifts the data supplied from the sign bit extraction section 220 to the left by 24 bits. In this manner, the sign data in which the sign bit 821 is "0" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the shift section 240. Accordingly, "0" of the sign bit 821 is added to "1" of the sign bit 811 to generate the object data in which the sign bit 811 is not converted. If the sign bit of the condition data is "0" and the sign bit of object data is "0", since "0" of the sign bit 821 is added to "0" of the sign bit 811, the object data in which the sign bit 811 is not converted is generated.

Next, an operation of the processor 100 of a fourth exemplary configuration of the processor 100 according to the first embodiment of the invention will be described with reference to the drawings.

Figure 9:
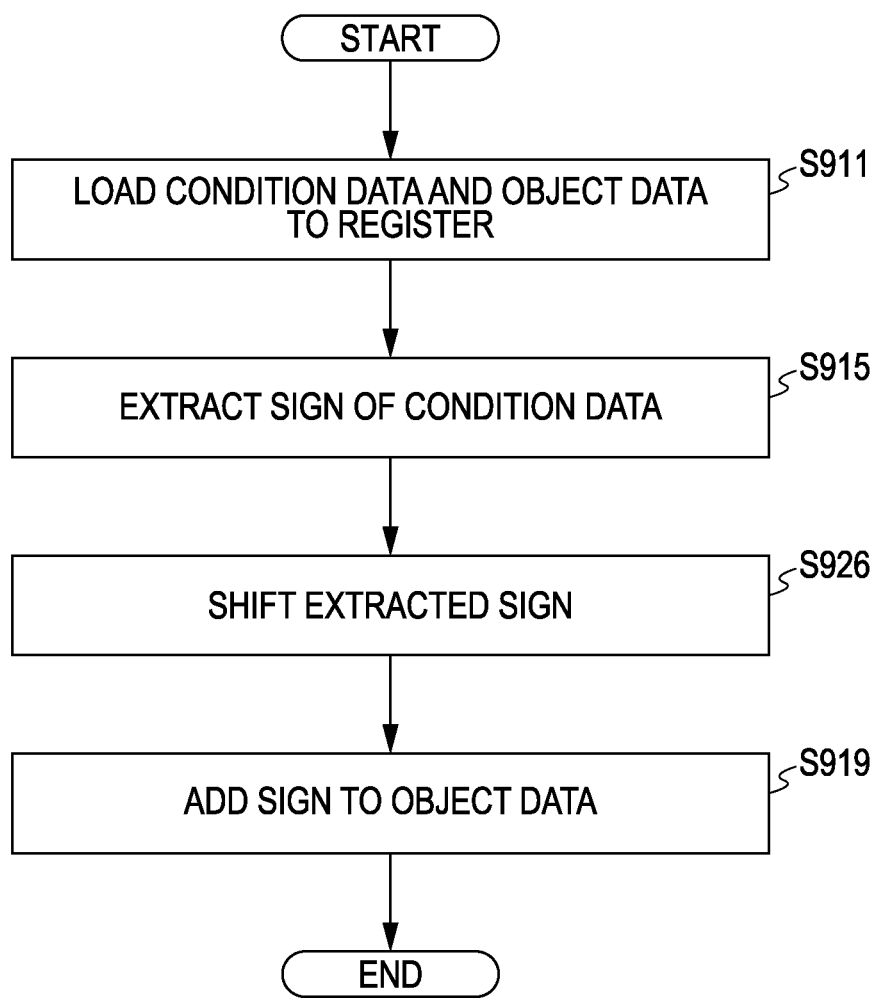
FIG. 9 is a flowchart illustrating exemplary steps in a sign addition process in the fourth exemplary configuration of the processor 100 according to the first embodiment of the invention.

FIG. 9 is a flowchart illustrating exemplary steps in a sign addition process in the fourth exemplary configuration of the processor 100 according to the first embodiment of the invention.

First, the 8-bit length condition data and the 32-bit length object data are loaded into the register 140 from the memory 120 (step S911). Next, the sign bit extraction section 220 extracts the sign bit of the condition data (step S915). Next, the shift section 240 shifts the data supplied from the sign bit extraction section 220 to the left by 24 bits (step S926). Subsequently, the sign adding section 300 adds the sign to the object data (step S919).

Thus, since the processor 100 includes the bit string holding section 212 and the shift section 240, when the condition data and the object data have different bit lengths, the sign can be added to the object data on the basis of the condition data and the object data. That is, even if the condition data and the object data have different bit lengths, the processor 100 can add the sign to the object data if the sign bit of the condition data is "1" as in the processor 100 illustrated in FIG. 2.

Fifth Exemplary Configuration of Processor

Figure 10:
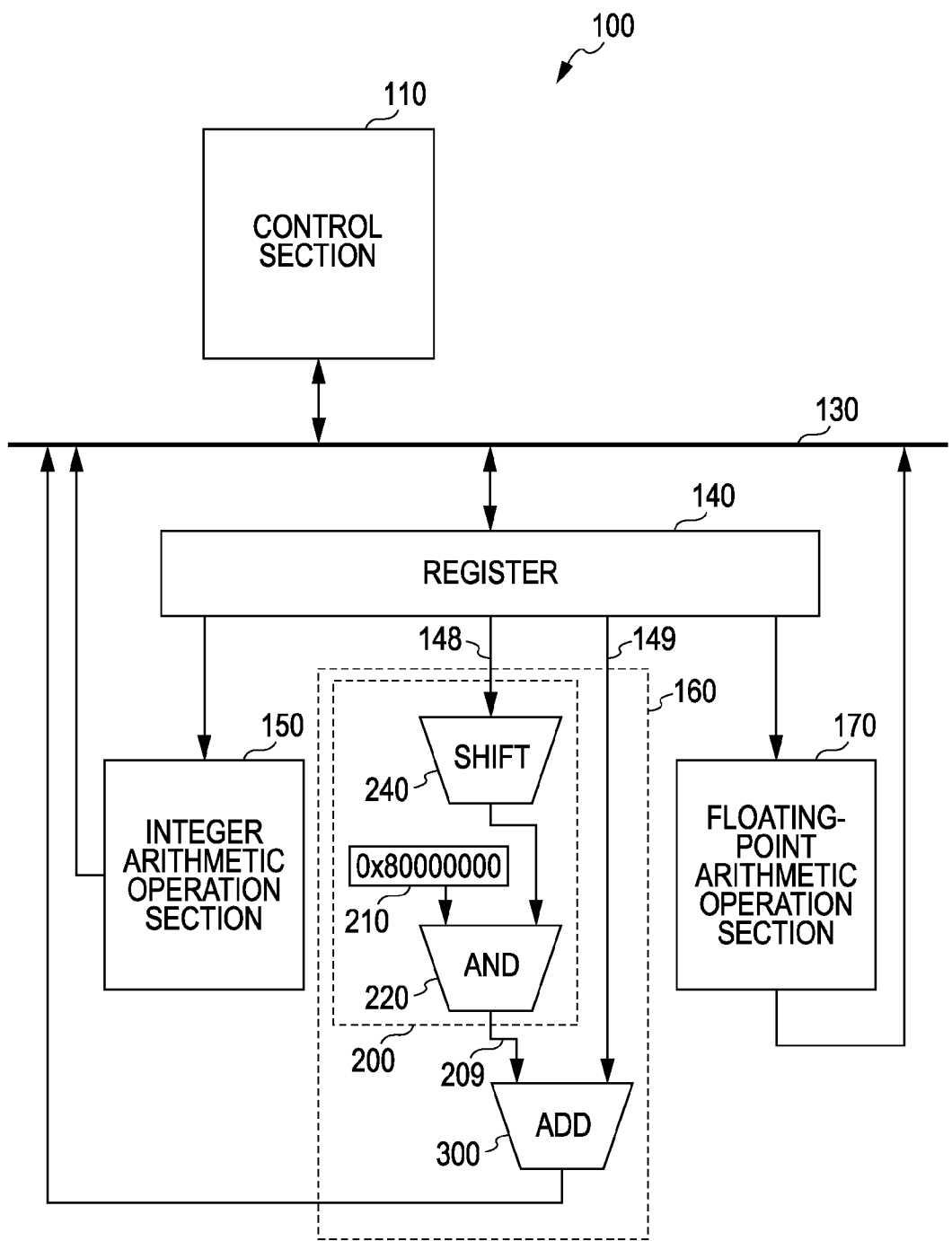
FIG. 10 is a block diagram illustrating a fifth exemplary configuration of the processor 100 according to the first embodiment of the invention.

FIG. 10 is a block diagram illustrating a fifth exemplary configuration of the processor 100 according to the first embodiment of the invention. The present processor 100 is the same as that illustrated in FIG. 2 except that the shift section 240 illustrated in FIG. 8 is included. Since the present processor 100 has the same configuration as that illustrated in FIG. 2 except for the shift section 240, similar components will be denoted by similar reference numerals and description thereof will be omitted. The sign data generating section 200 illustrated in FIG. 10 is an exemplary sign data generating section recited in the claims.

The processor 100 supplies the condition data to the shift section 240 via the signal line 148.

The shift section 240 supplies the shifted data to the sign bit extraction section 220 as new condition data. When the 8-bit condition data is supplied via the signal line 148, for example, the shift section 240 generates the new condition data in which the sign bit has been shifted to the left by 24 bits. The shift section 240 supplies the generated new condition data to the sign bit extraction section 220.

In this configuration, it is assumed that the sign is added to the object data on the basis of the 8-bit condition data in which the sign bit of the integer type data represents "1" and the 32-bit object data in which the sign bit of floating-point type data represents "1."

The shift section 240 shifts the condition data supplied via the signal line 148 to the left by 24 bits. Accordingly, the new data in which the 31th bit representing the sign bit 821 is "1" and all other bits are "0" is generated. The generated condition data is supplied to the sign bit extraction section 220. Then, the sign bit extraction section 220 extracts the sign bit 821 from the condition data through the logical product (AND) arithmetic operation on the basis of the new condition data supplied from the shift section 240 and the bit string supplied from the bit string holding section 210. In this manner, the sign data in which the sign bit 821 is "1" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the sign bit extraction section 220. In this manner, "1" of the sign bit 821 is added to "1" of the sign bit 811 to generate the object data in which the sign bit 811 is converted into "0." The exponent part 812 and the mantissa part 813 are not converted at this time. If the sign bit of the condition data is "1" and the sign bit 811 of the object data is "0," the sign bit 811 is converted from "0" into "1" and, the exponent part 812 and the mantissa part 813 are not converted.

In this configuration, it is assumed that the sign is added to the object data on the basis of the 8-bit condition data in which the sign bit of the integer type data represents "0" and the 32-bit object data in which the sign bit of floating-point type data represents "1."

The shift section 240 shifts the condition data supplied via the signal line 148 to the left by 24 bits. Accordingly, the new data in which the 31th bit representing the sign bit 821 is "0" and all other bits are "0" is generated. The generated condition data is supplied to the sign bit extraction section 220. Then, the sign bit extraction section 220 extracts the sign bit 821 from the condition data through the logical product (AND) arithmetic operation on the basis of the new condition data supplied from the shift section 240 and the bit string supplied from the bit string holding section 210. In this manner, the sign data in which the sign bit 821 is "0" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the sign bit extraction section 260. Accordingly, "0" of the sign bit 821 is added to "1" of the sign bit 811 to generate the object data in which the sign bit 811 is not converted. If the sign bit of the condition data is "0" and the sign bit of object data is "0", since "0" of the sign bit 821 is added to "0" of the sign bit 811, the object data in which the sign bit 811 is not converted is generated.

Next, an operation of the processor 100 of a fifth exemplary configuration of the processor 100 according to the first embodiment of the invention will be described with reference to the drawings.

Figure 11:
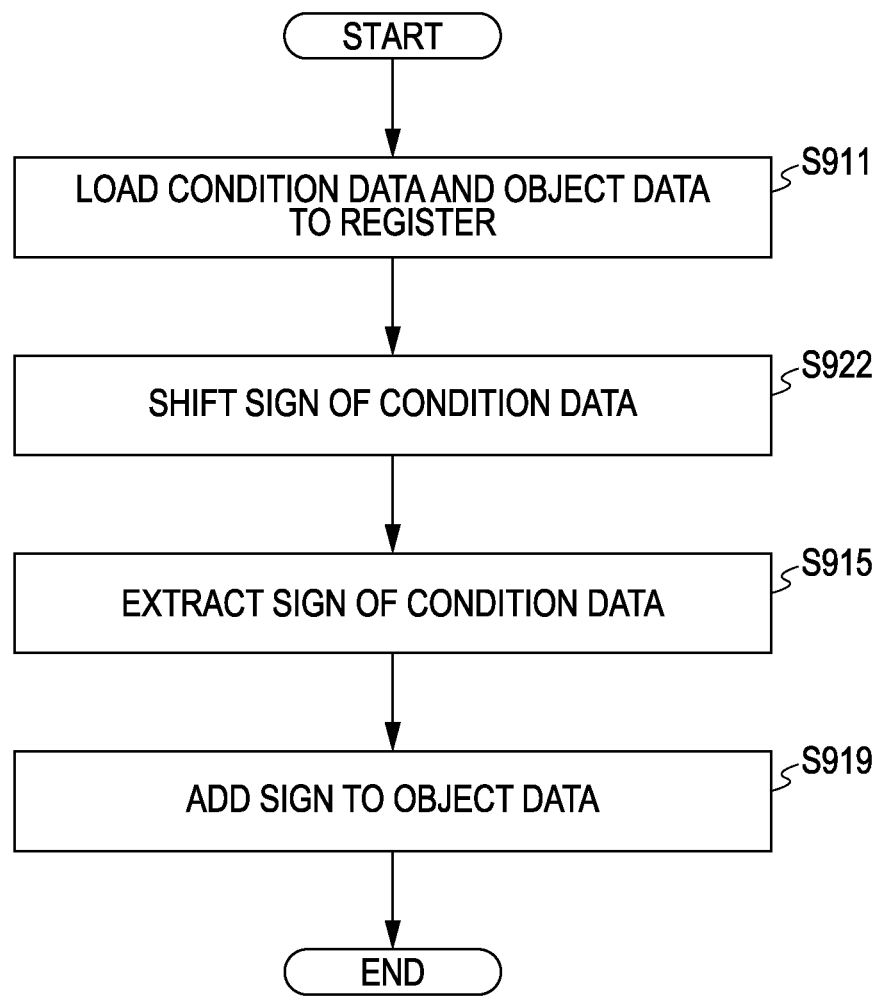
FIG. 11 is a flowchart illustrating exemplary steps in a sign addition process in the fifth exemplary configuration of the processor 100 according to the first embodiment of the invention.

FIG. 11 is a flowchart illustrating exemplary steps in a sign addition process in the fifth exemplary configuration of the processor 100 according to the first embodiment of the invention.

First, the 8-bit length condition data and the 32-bit length object data are loaded into the register 140 from the memory 120 (step S911). Next, the shift section 240 shifts the sign bit of the condition data to the left by 24 bits and generates the condition data (step S922). Next, the sign bit extraction section 220 extracts the sign bit of the condition data supplied from the shift section 240 (step S915). Subsequently, the sign adding section 300 adds the sign to the object data (step S919).

Since the processor 100 includes the shift section 240, when the condition data and the object data have different bit lengths, the sign can be added to the object data on the basis of the condition data and the object data. That is, even if the condition data and the object data have different bit lengths, the processor 100 can add the sign to the object data if the sign bit of the condition data is "1" as in the processor 100 illustrated in FIG. 2.

Sixth Exemplary Configuration of Processor

Figure 12:
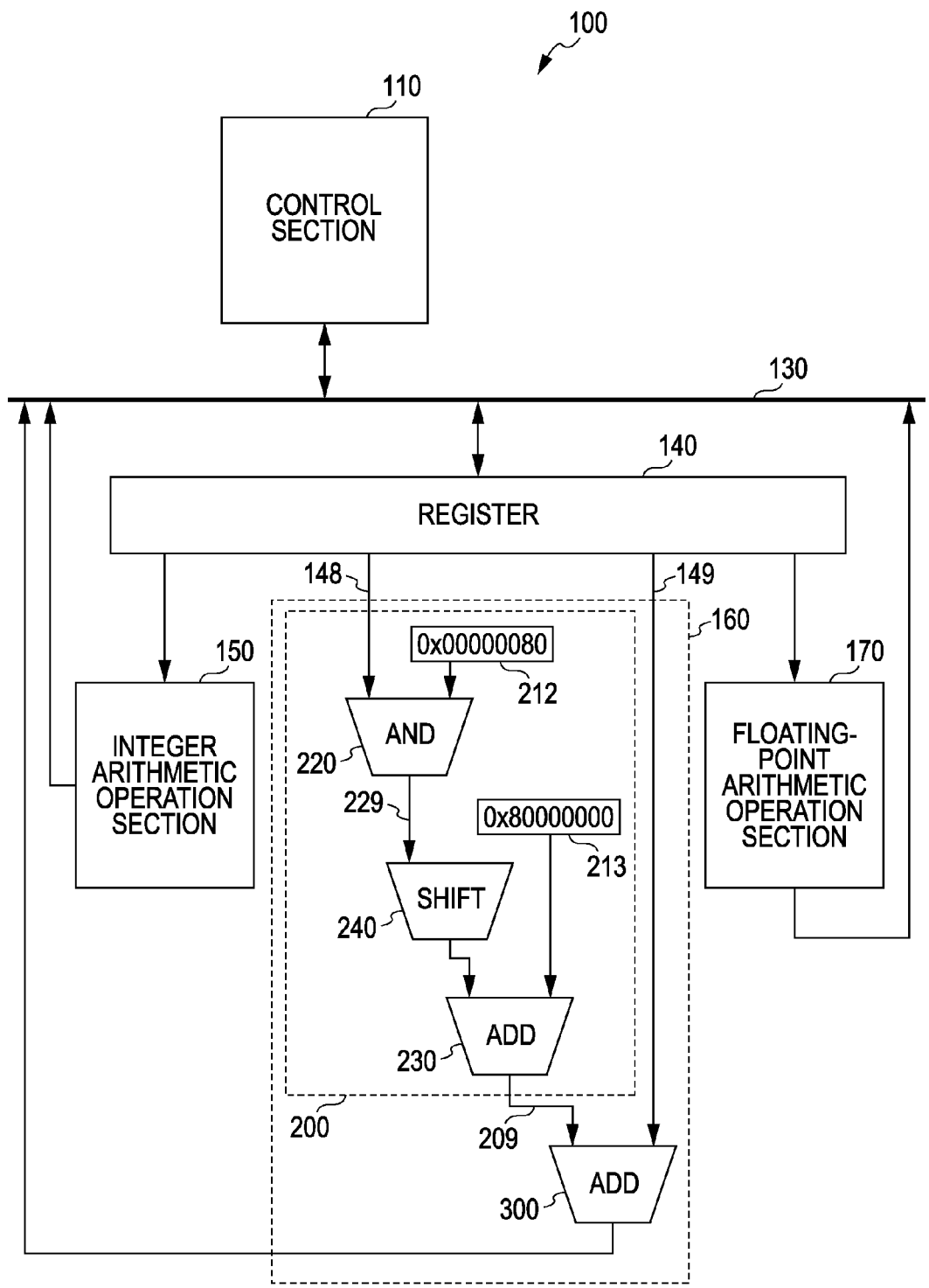
FIG. 12 is a block diagram illustrating a sixth exemplary configuration of the processor 100 according to the first embodiment of the invention.

FIG. 12 is a block diagram illustrating a sixth exemplary configuration of the processor 100 according to the first embodiment of the invention. The present processor 100 is the same as that illustrated in FIG. 8 except that a bit string holding section 213 and the inverting section 230, which is illustrated in FIG. 4, are included. Since the present processor 100 has the same configuration as that illustrated in FIG. 8 except for the bit string holding section 213 and the inverting section 230, similar components will be denoted by similar reference numerals and description thereof will be omitted. The sign data generating section 200 illustrated in FIG. 12 is an exemplary sign data generating section recited in the claims.

The bit string holding section 213 keeps the bit string for inverting the sign bit supplied from the shift section 240 in the inverting section 230. The bit string holding section 213 keeps the bit string of "0x80000000" of the hexadecimal number, for example, if the sign bit supplied from the shift section 240 is 32-bit data. The bit string holding section 213 supplies the currently kept bit string to the inverting section 230.

The inverting section 230 inverts the sign bit supplied from the shift section 240 on the basis of the bit string supplied from the bit string holding section 213. The inverting section 230 supplies the sign bit with an inverted sign to the sign adding section 300 as the sign data.

In this configuration, it is assumed that the sign is added to the object data on the basis of the 8-bit condition data in which the sign bit of the integer type data represents "0" and the 32-bit object data in which the sign bit of floating-point type data represents "1."

The sign bit extraction section 220 extracts the sign bit 821 from the condition data through the logical product (AND) arithmetic operation on the basis of the condition data supplied via the signal line 148 and the bit string supplied from the bit string holding section 212. Accordingly, data is generated in which the 7th bit representing the sign bit of the condition data is "0" and all other bits are "0." Then, the shift section 240 shifts the data supplied from the sign bit extraction section 220 to the left by 24 bits. Accordingly, the data with the 31th bit representing the sign bit 821 is "0" and all other bits are "0" is generated and the generated data is supplied to the inverting section 230.

The inverting section 230 then performs the arithmetic addition (ADD) operation on the basis of the data supplied from the shift section 240 and the bit string supplied from the bit string holding section 213. The inverting section 230 inverts the bit which represents the sign bit of the data supplied from the shift section 240. In this manner, the sign data in which the sign bit 821 is "1" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the inverting section 230. In this manner, "1" of the sign bit 821 is added to "1" of the sign bit 811 to generate the object data in which the sign bit 811 is converted into "0." The exponent part 812 and the mantissa part 813 are not converted at this time. If the sign bit of the condition data is "1" and the sign bit 811 of the object data is "0," the sign bit 811 is converted from "0" into "1" and, the exponent part 812 and the mantissa part 813 are not converted.

In this configuration, it is assumed that the sign is added to the object data on the basis of the 8-bit condition data in which the sign bit of the integer type data represents "1" and the 32-bit object data in which the sign bit of floating-point type data represents "1."

The sign bit extraction section 220 extracts the sign bit 821 from the condition data through the logical product (AND) arithmetic operation on the basis of the condition data supplied via the signal line 148 and the bit string supplied from the bit string holding section 212. Accordingly, the data is generated in which the 7th bit representing the sign bit of the condition data is "1" and all other bits are "0." Then, the shift section 240 shifts the data supplied from the sign bit extraction section 220 to the left by 24 bits. Accordingly, the data in which the 31th bit representing the sign bit 821 is "1" and all other bits are "0" is generated and the generated data is supplied to the inverting section 230.

The inverting section 230 then performs the arithmetic addition (ADD) operation on the basis of the data supplied from the shift section 240 and the bit string supplied from the bit string holding section 213. The inverting section 230 inverts the bit which represents the sign bit of the data supplied from the shift section 240. In this manner, the sign data in which the sign bit 821 is "0" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the inverting section 230. Accordingly, "0" of the sign bit 821 is added to "1" of the sign bit 811 to generate the object data in which the sign bit 811 is not converted. If the sign bit of the condition data is "0" and the sign bit of object data is "0", since "0" of the sign bit 821 is added to "0" of the sign bit 811, the object data in which the sign bit 811 is not converted is generated.

Next, an operation of the processor 100 of a sixth exemplary configuration of the processor 100 according to the first embodiment of the invention will be described with reference to the drawings.

Figure 13:
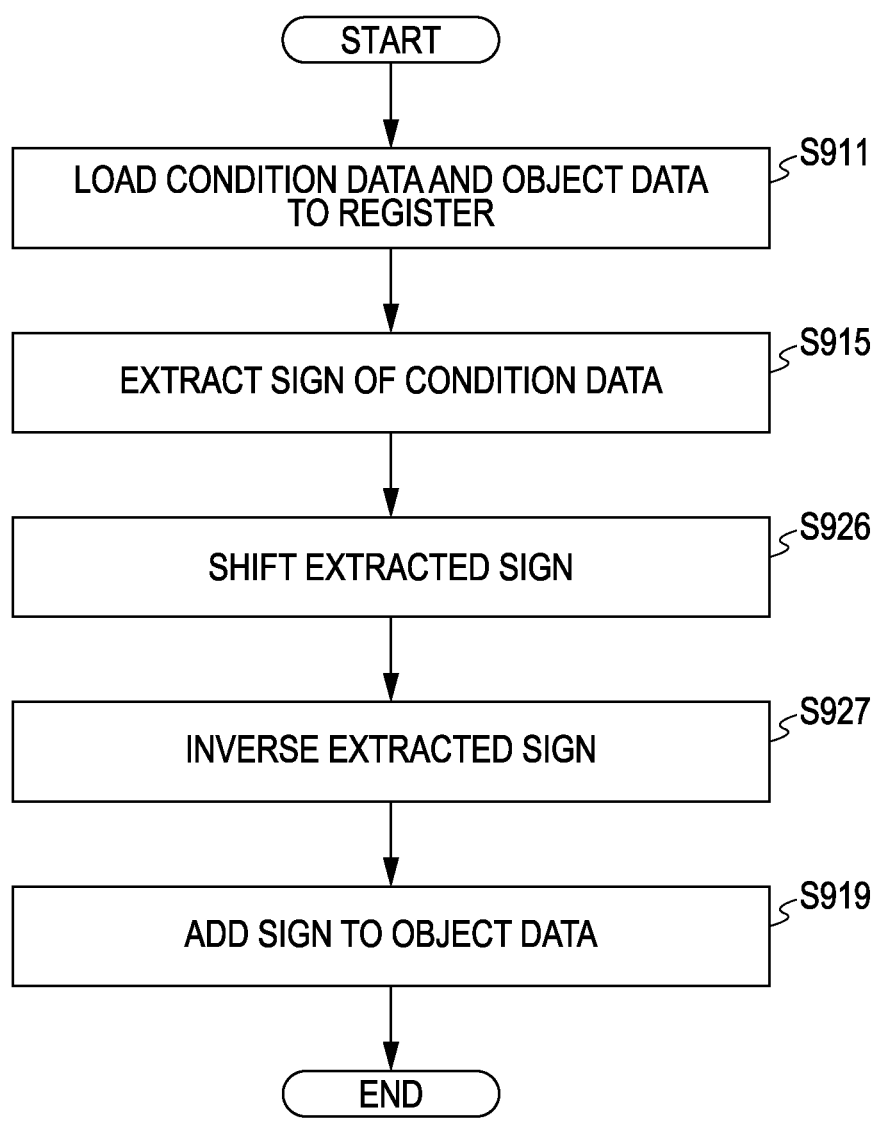
FIG. 13 is a flowchart illustrating exemplary steps in a sign addition process in the sixth exemplary configuration of the processor 100 according to the first embodiment of the invention.

FIG. 13 is a flowchart illustrating exemplary steps in a sign addition process in the sixth exemplary configuration of the processor 100 according to the first embodiment of the invention.

First, the 8-bit length condition data and the 32-bit length object data are loaded into the register 140 from the memory 120 (step S911). Next, the sign bit extraction section 220 extracts the sign bit of the condition data (step S915). Next, the shift section 240 shifts the data supplied from the sign bit extraction section 220 to the left by 24 bits (step S926). The inverting section 230 then inverts the extracted sign bit (step S927). Subsequently, the sign adding section 300 adds the sign to the object data (step S919).

Since the processor 100 includes the shift section 240, the bit string holding section 213 and the inverting section 230, even if the condition data and the object data have different bit lengths, the sign can be added to the object data on the basis of the condition data and the object data. That is, even if the condition data and the object data have different bit lengths, the processor 100 can add the sign to the object data if the sign bit of the condition data is "0" as in the processor 100 illustrated in FIG. 4.

Seventh Exemplary Configuration of Processor

Figure 14:
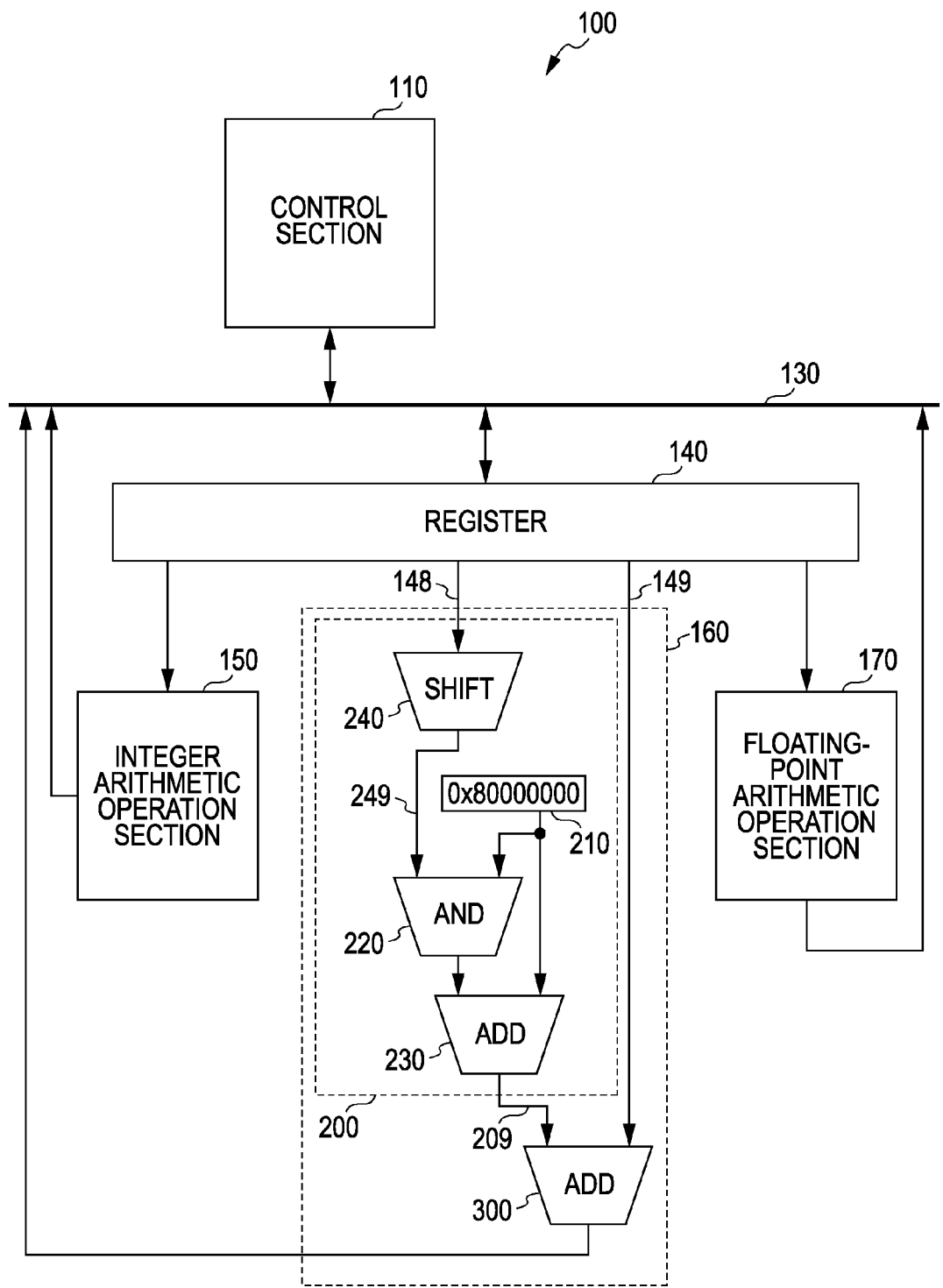
FIG. 14 is a block diagram illustrating a seventh exemplary configuration of the processor 100 according to the first embodiment of the invention.

FIG. 14 is a block diagram illustrating a seventh exemplary configuration of the processor 100 according to the first embodiment of the invention. The present processor 100 is the same as that illustrated in FIG. 10 except that the sign data generating section 200 includes the inverting section 230 illustrated in FIG. 2. Since the present processor 100 has the same configuration as that illustrated in FIG. 10 except for the inverting section 230, similar components will be denoted by similar reference numerals and description thereof will be omitted. The sign data generating section 200 illustrated in FIG. 14 is an exemplary sign data generating section recited in the claims.

The inverting section 230 inverts the sign bit supplied from the sign bit extraction section 220 on the basis of the bit string supplied from the bit string holding section 210.

In this configuration, it is assumed that the sign is added to the object data on the basis of the 8-bit condition data in which the sign bit of the integer type data represents "0" and the 32-bit object data in which the sign bit of floating-point type data represents "1."

The shift section 240 shifts the condition data supplied via the signal line 148 to the left by 24 bits. Accordingly, the new data in which the 31th bit representing the sign bit 821 is "0" and all other bits are "0" is generated. The generated condition data is supplied to the sign bit extraction section 220. Then, the sign bit extraction section 220 extracts the sign bit 821 from the condition data through the logical product (AND) arithmetic operation on the basis of the new condition data supplied from the shift section 240 and the bit string supplied from the bit string holding section 210. In this manner, the data in which the sign bit 821 is "0" and the entire integer part 822 is "0" is generated and the generated data is supplied to the inverting section 230.

The inverting section 230 then performs the arithmetic addition (ADD) operation on the basis of the data supplied from the sign bit extraction section 220 and the bit string supplied from the bit string holding section 210. The inverting section 230 inverts the bit which represents the sign bit of the data supplied from the sign bit extraction section 220. In this manner, the sign data in which the sign bit 821 is "1" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the inverting section 230. In this manner, "1" of the sign bit 821 is added to "1" of the sign bit 811 to generate the object data in which the sign bit 811 is converted into "0." The exponent part 812 and the mantissa part 813 are not converted at this time. If the sign bit of the condition data is "1" and the sign bit 811 of the object data is "0," the sign bit 811 is converted from "0" into "1" and, the exponent part 812 and the mantissa part 813 are not converted.

In this configuration, it is assumed that the sign is added to the object data on the basis of the 8-bit condition data in which the sign bit of the integer type data represents "1" and the 32-bit object data in which the sign bit of floating-point type data represents "1."

The shift section 240 shifts the condition data supplied via the signal line 148 to the left by 24 bits. Accordingly, the new data in which the 31th bit representing the sign bit 821 is "1" and all other bits are "0" is generated and the generated condition data is supplied to the sign bit extraction section 220. Then, the sign bit extraction section 220 extracts the sign bit 821 from the condition data through the logical product (AND) arithmetic operation on the basis of the new condition data supplied from the shift section 240 and the bit string supplied from the bit string holding section 210. In this manner, the sign data in which the sign bit 821 is "1" and the entire integer part 822 is "0" is generated and the generated sign data is supplied to the inverting section 230.

The inverting section 230 then performs the arithmetic addition (ADD) operation on the basis of the data supplied from the sign bit extraction section 220 and the bit string supplied from the bit string holding section 210. The inverting section 230 inverts the bit which represents the sign bit of the condition data of the data supplied from the sign bit extraction section 220. In this manner, the sign data in which the sign bit 821 is "0" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the inverting section 230. Accordingly, "0" is added to "1" of the sign bit 811 to generate the object data in which the sign bit 811 is not converted. If the sign bit of the condition data is "1" and the sign bit of object data is "0", since "0" of the sign bit 821 is added to "0" of the sign bit 811, the object data in which the sign bit 811 is not converted is generated.

Next, an operation of the processor 100 of a seventh exemplary configuration of the processor 100 according to the first embodiment of the invention will be described with reference to the drawings.

Figure 15:
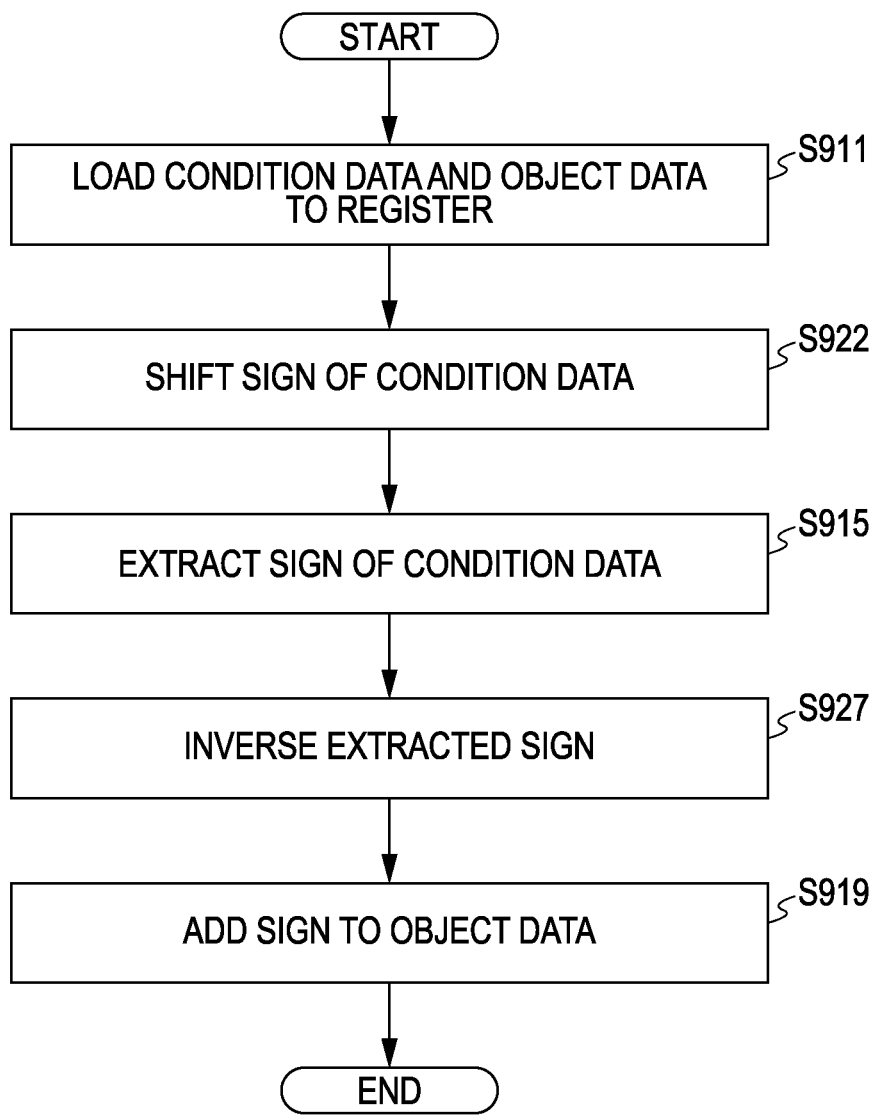
FIG. 15 is a flowchart illustrating exemplary steps in a sign addition process in the seventh exemplary configuration of the processor 100 according to the first embodiment of the invention.

FIG. 15 is a flowchart illustrating exemplary steps in a sign addition process in the seventh exemplary configuration of the processor 100 according to the first embodiment of the invention.

First, the 8-bit length condition data and the 32-bit length object data are loaded into the register 140 from the memory 120 (step S911). Next, the shift section 240 shifts the sign bit of the condition data to the left by 24 bits to generate new condition data (step S922). Next, the sign bit extraction section 220 extracts the sign bit of the condition data supplied from the shift section 240 (step S915). The inverting section 230 then inverts the extracted sign bit (step S927). Subsequently, the sign adding section 300 adds the sign to the object data (step S919).

Thus, since the processor 100 includes the shift section 240 and the inverting section 230, even if the condition data and the object data have different bit lengths, the sign can be added to the object data on the basis of the condition data and the object data. That is, even if the condition data and the object data have different bit lengths, the processor 100 can add the sign to the object data if the sign bit of the condition data is "0" as in the processor 100 illustrated in FIG. 4.

Eighth Exemplary Configuration of Processor

Figure 16:
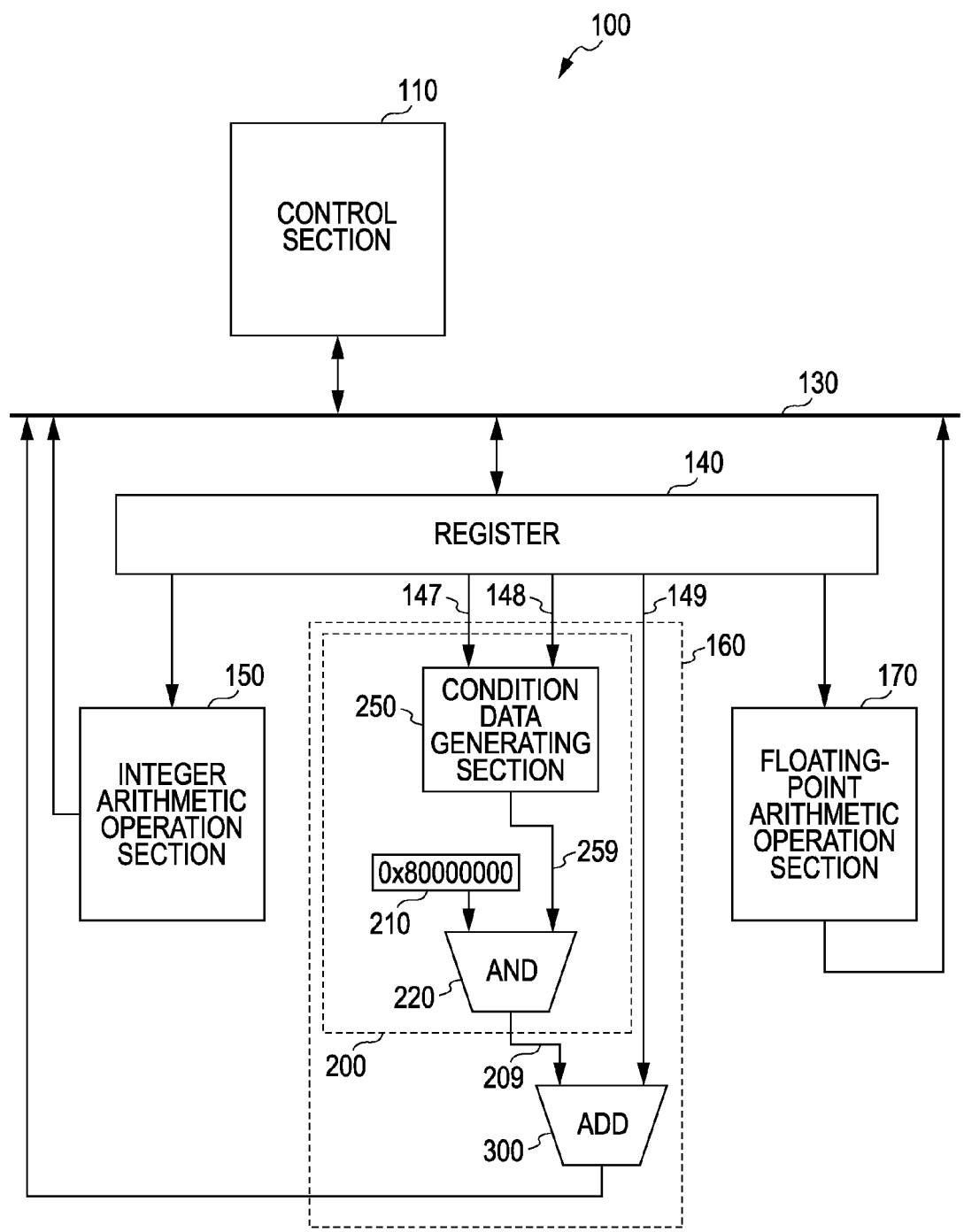
FIG. 16 is a block diagram illustrating an eighth exemplary configuration of the processor 100 according to the first embodiment of the invention.

FIG. 16 is a block diagram illustrating an eighth exemplary configuration of the processor 100 according to the first embodiment of the invention. The present processor 100 is the same as that illustrated in FIG. 2 except that a condition data generating section 250 is included. Since the present processor 100 has the same configuration as that illustrated in FIG. 2 except for the condition data generating section 250, similar components will be denoted by similar reference numerals and description thereof will be omitted. The sign data generating section 200 illustrated in FIG. 16 is an exemplary sign data generating section recited in the claims.

The processor 100 supplies, to the condition data generating section 250, the second condition data via the first condition data and the signal line 148 via the signal line 147.

The condition data generating section 250 generates new condition data on the basis of the condition data supplied via the signal line 147 and the signal line 148. The condition data generating section 250 is implemented by, for example, the arithmetic subtracting circuit which performs an arithmetic subtraction (SUB) operation of the second condition data from the first condition data. The condition data generating section 250 is implemented by, for example, the AND operation circuit which performs the logical product (AND) arithmetic operation of the first condition data and the second condition data. The condition data generating section 250 is implemented by, for example, the OR operation circuit which performs the logical sum (OR) arithmetic operation of the first condition data and the second condition data. The condition data generating section 250 supplies the generated new condition data to the sign bit extraction section 220. Although the condition data generating section 250 described above generates new condition data on the basis of the two condition data by a single arithmetic circuit, two or more arithmetic circuits may alternatively be combined to generate new condition data on the basis of two or more condition data. Alternatively, the object data can be supplied to the condition data generating section 250 as the condition data.

In this configuration, it is assumed that the condition data generating section 250 is implemented by the arithmetic subtracting circuit. It is assumed that the sign bit of the first condition data is "1" and a value represented by the integer part is "5," the sign bit of the second condition data is "1" and a value represented by the integer part is "3" and the sign bit of the single-precision floating-point type data is "1."

In this case, the condition data generating section 250 subtracts the value of the second condition data from the value of the first condition data. In particular, "−3" is subtracted from "−5" to obtain"−2," and the new condition data with the sign bit of "1" is generated and supplied to the sign bit extraction section 220. Then, the sign bit extraction section 220 extracts the sign bit 821 from the new condition data through the logical product (AND) arithmetic operation on the basis of the new condition data supplied via the condition data generating section 250 and the bit string supplied from the bit string holding section 210. In this manner, the sign data in which the sign bit 821 is "1" and the integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the sign bit extraction section 220. Accordingly, the object data in which the sign bit 811 is converted into "0" when "1" is added to "1" and the exponent part 812 and the mantissa part 813 are not converted is generated.

In this configuration, it is assumed that the condition data generating section 250 is implemented by the arithmetic subtracting circuit. It is assumed that the sign bit of the first condition data is "0" and a value represented by the integer part is "5," the sign bit of the second condition data is "1" and a value represented by the integer part is "3" and the sign bit of the single-precision floating-point type data is "1."

In this case, the condition data generating section 250 subtracts the value of the second condition data from the value of the first condition data. In particular, "−3" is subtracted from "5" to obtain "8," and the new condition data with the sign bit of "0" is generated and supplied to the sign bit extraction section 220. Then, the sign bit extraction section 220 extracts the sign bit 821 from the new condition data through the logical product (AND) arithmetic operation on the basis of the new condition data supplied from condition data generating section 250 and the bit string supplied from the bit string holding section 210. In this manner, the sign data in which the sign bit 821 is "0" and all the integer part 822 are "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the sign bit extraction section 220. Accordingly, the object data in which the sign bit 811 is not converted with "0" being added to "1" and neither the exponent 812 nor the fraction 813 are converted is generated.

In this manner, since the processor includes the arithmetic subtracting circuit as the condition data generating section 250, the processor 100 can convert the sign of the object data if the first condition data is smaller than the second condition data.

Since the processor 100 includes the AND operation circuit as the condition data generating section 250 in place of the arithmetic subtracting circuit, the sign of object data can be converted if both the first condition data and the second condition data are negative. Since the processor 100 includes the OR operation circuit as the condition data generating section 250, the sign of the object data can be converted if either of the first condition data or the second condition data is negative.

Next, an operation of the processor 100 of an eighth exemplary configuration of the processor 100 according to the first embodiment of the invention will be described with reference to the drawings.

Figure 17:
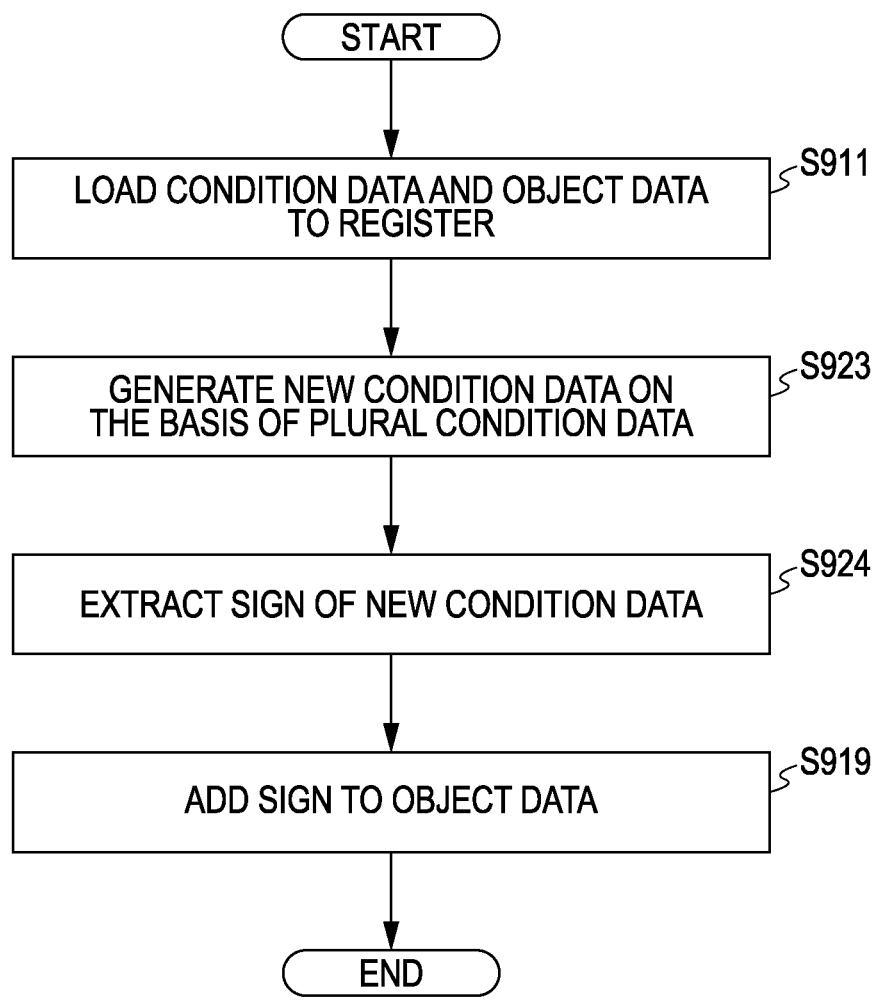
FIG. 17 is a flowchart illustrating exemplary steps in a sign addition process in the eighth exemplary configuration of the processor 100 according to the first embodiment of the invention.

FIG. 17 is a flowchart illustrating exemplary steps in a sign addition process in the eighth exemplary configuration of the processor 100 according to the first embodiment of the invention.

First, the first condition data, the second condition data and the object data are loaded into the register 140 from the memory 120 (step S911). Next, the condition data generating section 250 generates new condition data on the basis of the first condition data and the second condition data (step S923). Next, the sign bit extraction section 220 extracts the sign bit of the new condition data (step S924). Subsequently, the sign adding section 300 adds the sign to the object data (step S919).

Since the processor 100 includes the condition data generating section 250, the sign can be added to the object data on the basis of the plural condition data.

Ninth Exemplary Configuration of Processor

Figure 18:
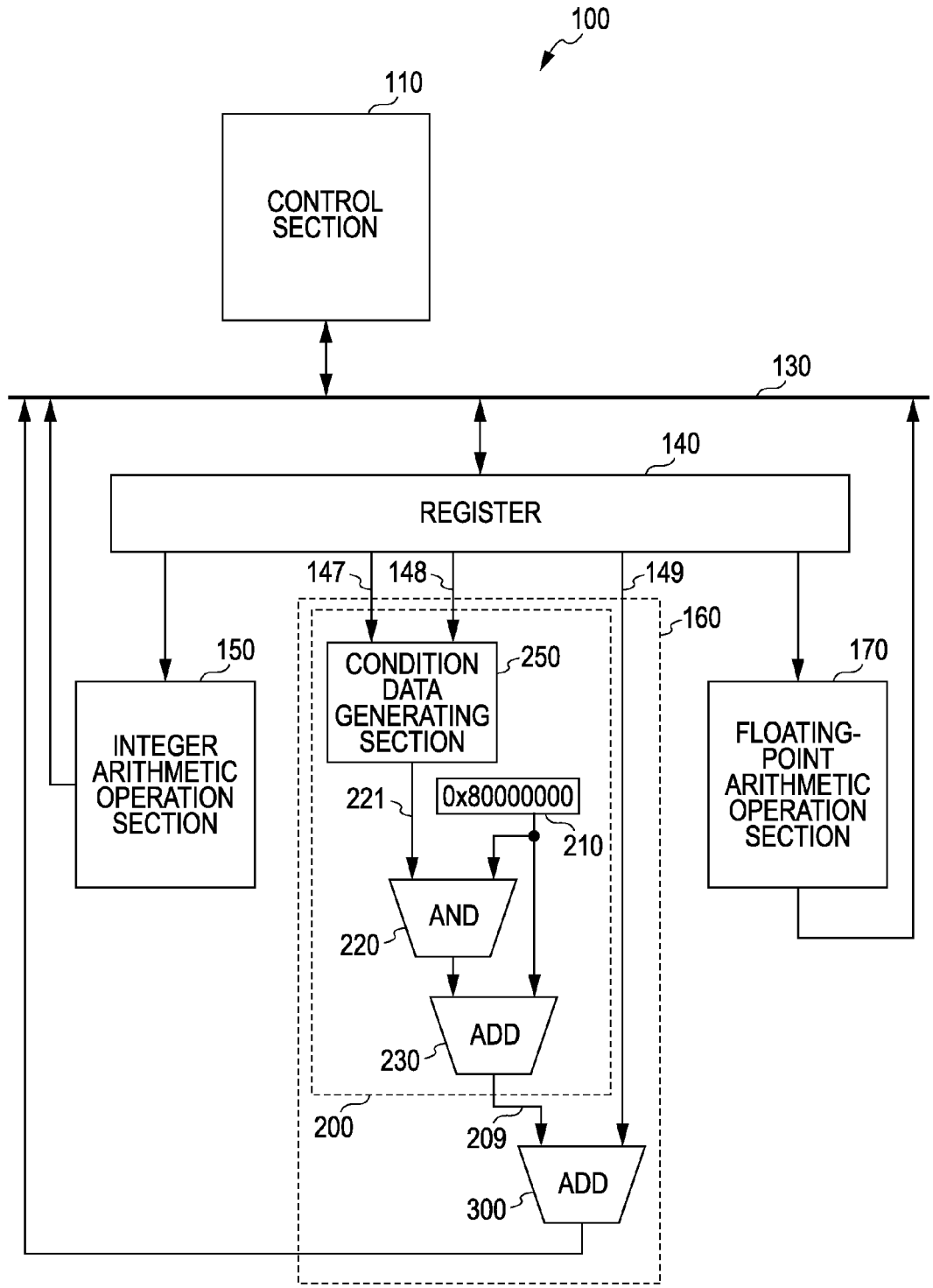
FIG. 18 is a block diagram illustrating a ninth exemplary configuration of the processor 100 according to the first embodiment of the invention.

FIG. 18 is a block diagram illustrating a ninth exemplary configuration of the processor 100 according to the first embodiment of the invention. The present processor 100 is the same as that illustrated in FIG. 16 except that the sign data generating section 200 includes the inverting section 230 illustrated in FIG. 2. Since the present processor 100 has the same configuration as that illustrated in FIG. 16 except for the inverting section 230, similar components will be denoted by similar reference numerals and description thereof will be omitted. The sign data generating section 200 illustrated in FIG. 18 is an exemplary sign data generating section recited in the claims.

The inverting section 230 inverts the sign bit supplied from the sign bit extraction section 220 on the basis of the bit string supplied from the bit string holding section 210. The inverting section 230 supplies the sign bit with an inverted sign to the sign adding section 300 as the sign data.

In this configuration, it is assumed that the condition data generating section 250 is implemented by the arithmetic subtracting circuit. It is assumed that the sign bit of the first condition data is "1" and a value represented by the integer part is "3," the sign bit of the second condition data is "1" and a value represented by the integer part is "5" and the sign bit of the single-precision floating-point type data is "1."

In this case, the condition data generating section 250 subtracts the value of the second condition data from the value of the first condition data. In particular, "−5" is subtracted from "−3" to obtain"−2," and the new condition data with the sign bit of "0" is generated and supplied to the sign bit extraction section 220. Then, the sign bit extraction section 220 extracts the sign bit 821 from the new condition data through the logical product (AND) arithmetic operation on the basis of the new condition data supplied from condition data generating section 250 and the bit string supplied from the bit string holding section 210. In this manner, the sign data in which the sign bit 821 is "0" and the entire integer part 822 is "0" is generated and the generated sign data is supplied to the inverting section 230.

The inverting section 230 then performs the arithmetic addition (ADD) operation on the basis of the data supplied from the sign bit extraction section 220 and the bit string supplied from the bit string holding section 210. The inverting section 230 inverts the bit which represents the sign bit of the condition data of the data supplied from the sign bit extraction section 220. In this manner, the sign data in which the sign bit 821 is "1" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the inverting section 230. Accordingly, the object data in which the sign bit 811 is converted into "0" when "1" is added to "1" and the exponent part 812 and the mantissa part 813 are not converted is generated.

In this configuration, it is assumed that the condition data generating section 250 is implemented by the arithmetic subtracting circuit. It is assumed that the sign bit of the first condition data is "0" and a value represented by the integer part is "3," the sign bit of the second condition data is "0" and a value represented by the integer part is "5" and the sign bit of the single-precision floating-point type data is "1."

In this case, the condition data generating section 250 subtracts the value of the second condition data from the value of the first condition data. In particular, "5" is subtracted from "3" to obtain"−2," and the new condition data with the sign bit of "1" is generated and supplied to the sign bit extraction section 220. Then, the sign bit extraction section 220 extracts the sign bit 821 from the new condition data through the logical product (AND) arithmetic operation on the basis of the new condition data supplied from condition data generating section 250 and the bit string supplied from the bit string holding section 210. In this manner, the sign data in which the sign bit 821 is "1" and the integer part 822 is "0" is generated and the generated sign data is supplied to the inverting section 230.

The inverting section 230 then performs the arithmetic addition (ADD) operation on the basis of the data supplied from the sign bit extraction section 220 and the bit string supplied from the bit string holding section 210. The inverting section 230 inverts the bit which represents the sign bit of the condition data of the data supplied from the sign bit extraction section 220. In this manner, the sign data in which the sign bit 821 is "0" and the entire integer part 822 is "0" is generated and the generated sign data is supplied to the sign adding section 300. The sign adding section 300 then adds the sign to the object data through the arithmetic addition (ADD) operation on the basis of the object data supplied via the signal line 149 and the sign data supplied from the inverting section 230. Accordingly, the object data in which the sign bit 811 is not converted with "0" being added to "1" and neither the exponent 812 nor the fraction 813 are converted is generated.

Since the processor 100 includes the arithmetic subtracting circuit as the condition data generating section 250, the sign of object data can be converted if the first condition data is larger than the second condition data.

Since the processor 100 includes the AND operation circuit as the condition data generating section 250 in place of the arithmetic subtracting circuit, the sign of object data can be converted if both the first condition data and the second condition data are positive. Since the processor 100 includes the OR operation circuit as the condition data generating section 250, the sign of the object data can be converted if either of the first condition data or the second condition data is positive.

Next, an operation of the processor 100 of a ninth exemplary configuration of the processor 100 according to the first embodiment of the invention will be described with reference to the drawings.

Figure 19:
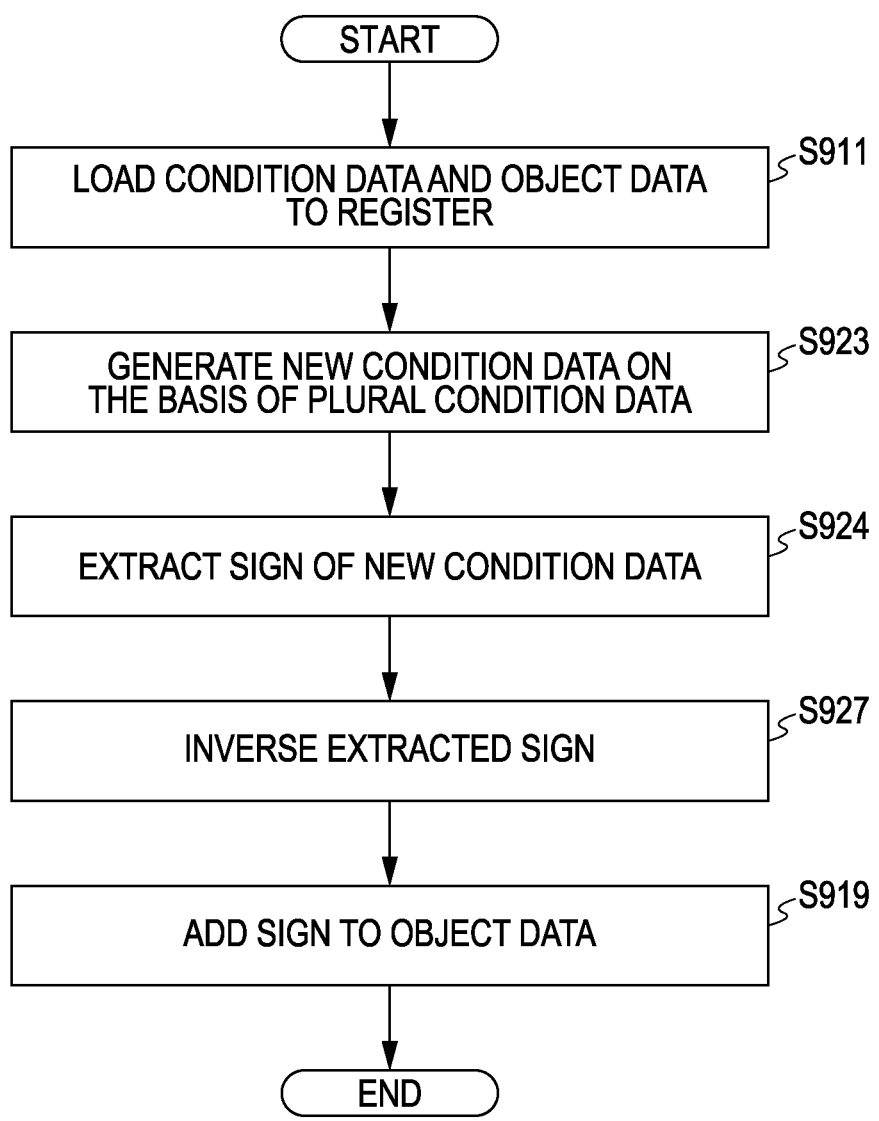
FIG. 19 is a flowchart illustrating exemplary steps in a sign addition process in the ninth exemplary configuration of the processor 100 according to the first embodiment of the invention.

FIG. 19 is a flowchart illustrating exemplary steps in a sign addition process in the ninth exemplary configuration of the processor 100 according to the first embodiment of the invention.

First, the first condition data, the second condition data and the object data are loaded into the register 140 from the memory 120 (step S911). Next, new condition data is generated by the condition data generating section 250 on the basis of the first condition data and the second condition data (step S923). Next, the sign bit of the new condition data is extracted by the sign bit extraction section 220 (step S924). The extracted sign bit is then inverted by the inverting section 230 (step S927). Subsequently, the sign is added to the object data by the sign adding section 300 (step S919).

Since the processor 100 includes the condition data generating section 250, the sign can be added on the basis of the object data of the plural condition data.

Tenth Exemplary Configuration of Processor

Figure 20:
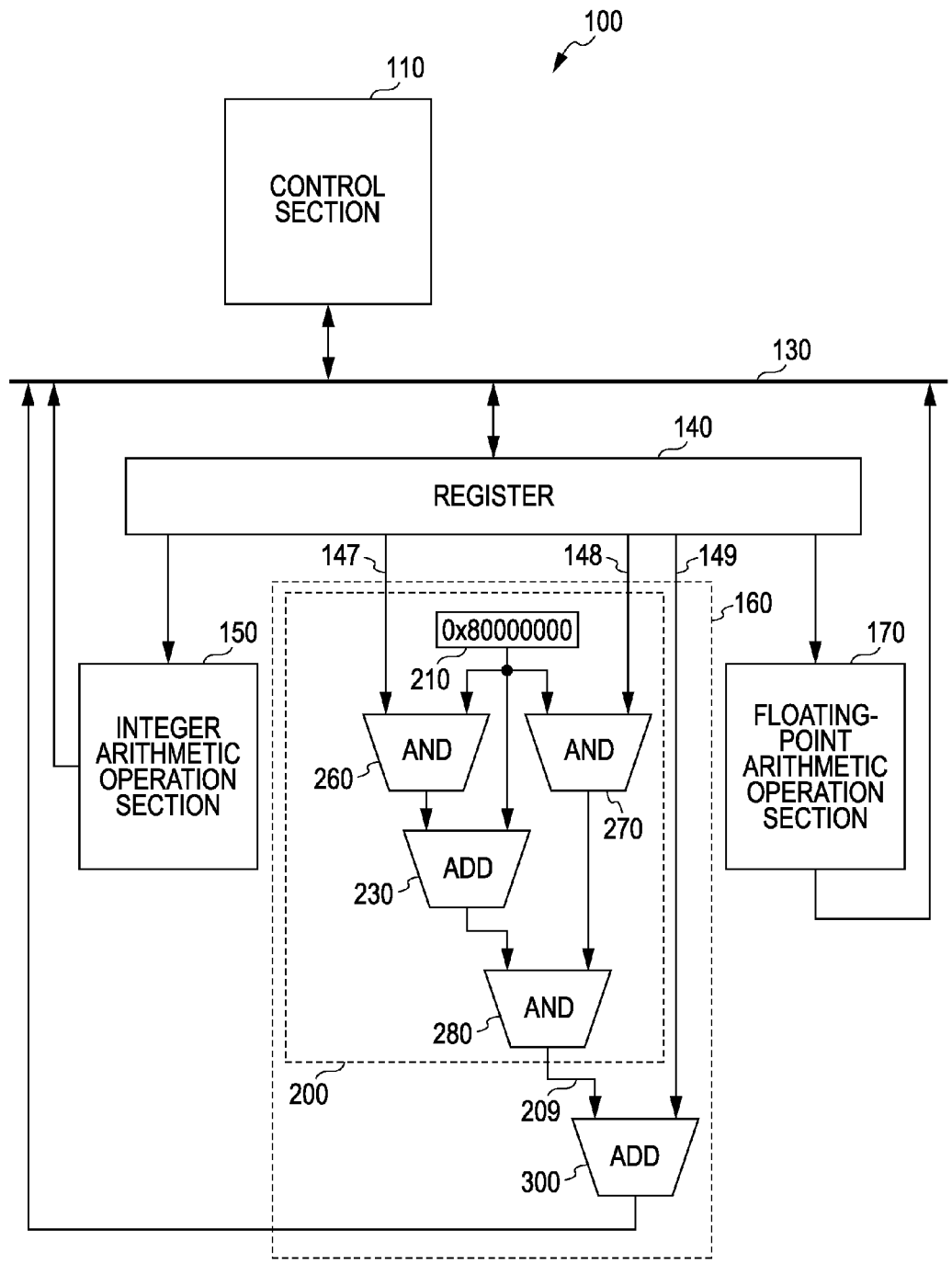
FIG. 20 is a block diagram illustrating a tenth exemplary configuration of the processor 100 according to the first embodiment of the invention.

FIG. 20 is a block diagram illustrating a tenth exemplary configuration of the processor 100 according to the first embodiment of the invention. Since the present processor 100 has the same configuration as that illustrated in FIG. 2, similar components will be denoted by similar reference numerals and description thereof will be omitted. The sign data generating section 200 illustrated in FIG. 20 is an exemplary sign data generating section recited in the claims.

The sign data generating section 200 includes a bit string holding section 210, an inverting section 230, a sign bit extraction sections 260 and 270, and a comparing section 280. The data supplied from the signal line 147 is called a first condition data and the data supplied from the signal line 148 is called as a second condition data.

The sign bit extraction section 260 extracts, as the condition, the sign bit representing the sign in the first condition data on the basis of the first condition data supplied from the signal line 147 and the bit string supplied from the bit string holding section 210. The sign bit extraction section 260 is implemented by the AND operation circuit which performs the logical product (AND), for example. The sign bit extraction section 220 supplies the extracted sign bit to the inverting section 230.

The sign bit extraction section 270 extracts, as the condition, the sign bit representing the sign in the second condition data on the basis of the second condition data supplied from the signal line 148 and the bit string supplied from the bit string holding section 210. The sign bit extraction section 270 is implemented by the AND operation circuit which performs the logical product (AND), for example. The sign bit extraction section 220 supplies the extracted sign bit to the comparing section 280.

The inverting section 230 inverts the sign bit extracted from the first condition data supplied from the sign bit extraction section 260 and the sign bit extracted from first condition data on the basis of the bit string supplied from the bit string holding section 210. The inverting section 230 supplies the inverted sign bit to the comparing section 280.

The comparing section 280 measures the extracted sign bits and generates a new sign bit. The comparing section 280 is implemented by the AND operation circuit which performs the logical product (AND) arithmetic, for example. The comparing section 280 is implemented by the OR operation circuit which performs the logical sum (OR) arithmetic, for example. The comparing section 280 supplies the generated new sign bit to the sign adding section 300 as the sign data.

In this configuration, it is assumed that the comparing section 280 is implemented by the AND operation circuit. It is assumed that the sign bit of the first condition data is "0," the sign bit of the second condition data is "1" and the sign bit of the single-precision floating-point type data is "1."

The sign bit extraction section 260 extracts the sign bit 821 from the first condition data through the logical product (AND) arithmetic operation on the basis of the first condition data supplied via the signal line 147 and the bit string supplied from the bit string holding section 210. Accordingly, the first data in which the bit representing the sign bit is "0" and all other bits are "0" is generated. The sign bit extraction section 270 extracts the sign bit 821 from the second condition data through the logical product (AND) arithmetic operation on the basis of the second condition data supplied via the signal line 148 and the bit string supplied from the bit string holding section 210. Accordingly, the second data in which the bit representing the sign bit is "1" and all other bits are "0" is generated.

The inverting section 230 then performs the arithmetic addition (ADD) operation on the basis of the first data supplied from the sign bit extraction section 260 and the bit string supplied from the bit string holding section 210. The inverting section 230 inverts the bit which represents the sign bit of the condition data of the first data supplied from the sign bit extraction section 260. Accordingly, the first data in which the bit representing the sign bit is "1" and all other bits are "0" is generated. Then, the comparing section 280 compares the first data with the second data through the logical product (AND) operation on the basis of the first data supplied from the inverting section 230 and the second data supplied from the sign bit extraction section 270. In this manner, the sign data in which the sign bit 821 is "1" and the entire integer part 822 is "0" is generated and the generated sign data is supplied to the sign adding section 300.

The sign adding section 300 then adds the sign to the object data through the arithmetic addition (ADD) operation on the basis of the object data supplied via the signal line 149 and the sign data supplied from the comparing section 280. In this manner, "1" of the sign bit 821 is added to "1" of the sign bit 811 to generate the object data in which the sign bit 811 is converted into "0." The exponent part 812 and the mantissa part 813 are not converted at this time. If the sign bit of the first condition data is "0," the sign bit of the second condition data is "1," the sign bit 811 of the object data is "0," the sign bit 811 is converted from "0" into "1" and other bits are not converted.

In this configuration, it is assumed that the comparing section 280 is implemented by the AND operation circuit. It is assumed that the sign bit of the first condition data is "1," the sign bit of the second condition data is "1" and the sign bit of the single-precision floating-point type data is "1."

The sign bit extraction section 260 extracts the sign bit 821 from the first condition data through the logical product (AND) arithmetic operation on the basis of the first condition data supplied via the signal line 147 and the bit string supplied from the bit string holding section 210. Accordingly, the first data in which the bit representing the sign bit is "1" and all other bits are "0" is generated. The sign bit extraction section 270 extracts the sign bit 821 from the second condition data through the logical product (AND) arithmetic operation on the basis of the second condition data supplied via the signal line 148 and the bit string supplied from the bit string holding section 210. Accordingly, the second data in which the bit representing the sign bit is "1" and all other bits are "0" is generated.

The inverting section 230 then performs the arithmetic addition (ADD) operation on the basis of the first data supplied from the sign bit extraction section 260 and the bit string supplied from the bit string holding section 210. The inverting section 230 inverts the bit which represents the sign bit of the condition data of the first data supplied from the sign bit extraction section 260. Accordingly, the first data in which the bit representing the sign bit is "0" and all other bits are "0" is generated. Then, the comparing section 280 compares the first data with the second data through the logical product (AND) operation on the basis of the first data supplied from the inverting section 230 and the second data supplied from the sign bit extraction section 270. In this manner, the sign data in which the sign bit 821 is "0" and the entire integer part 822 is "0" is generated and the generated sign data is supplied to the sign adding section 300.

The sign adding section 300 then adds the sign to the object data through the arithmetic addition (ADD) operation on the basis of the object data supplied via the signal line 149 and the sign data supplied from the comparing section 280. Accordingly, "0" of the sign bit 821 is added to "1" of the sign bit 811 to generate the object data in which the sign bit 811 is not converted.

If the sign bit of the first condition data is "1," the sign bit of the second condition data is "1," the sign bit 811 of the object data is "0," "0" of the sign bit 821 is added to "0" of the sign bit 811. Accordingly, the object data in which the sign bit 811 is not converted is generated.

If the sign bit of the first condition data is "1," the sign bit of the second condition data is "0," the sign bit 811 of the object data is "1," "0" of the sign bit 821 is added to "1" of the sign bit 811. Accordingly, the object data in which the sign bit 811 is not converted is generated.

If the sign bit of the first condition data is "1," the sign bit of the second condition data is "0," the sign bit 811 of the object data is "0," "0" of the sign bit 821 is added to "0" of the sign bit 811. Accordingly, the object data in which the sign bit 811 is not converted is generated.

If the sign bit of the first condition data is "0," the sign bit of the second condition data is "0," the sign bit 811 of the object data is "1," "0" of the sign bit 821 is added to "1" of the sign bit 811. Accordingly, the object data in which the sign bit 811 is not converted is generated.

If the sign bit of the first condition data is "0," the sign bit of the second condition data is "0," the sign bit 811 of the object data is "0," "0" of the sign bit 821 is added to "0" of the sign bit 811. Accordingly, the object data in which the sign bit 811 is not converted is generated.

Next, an operation of the processor 100 of a tenth exemplary configuration of the processor 100 according to the first embodiment of the invention will be described with reference to the drawings.

Figure 21:
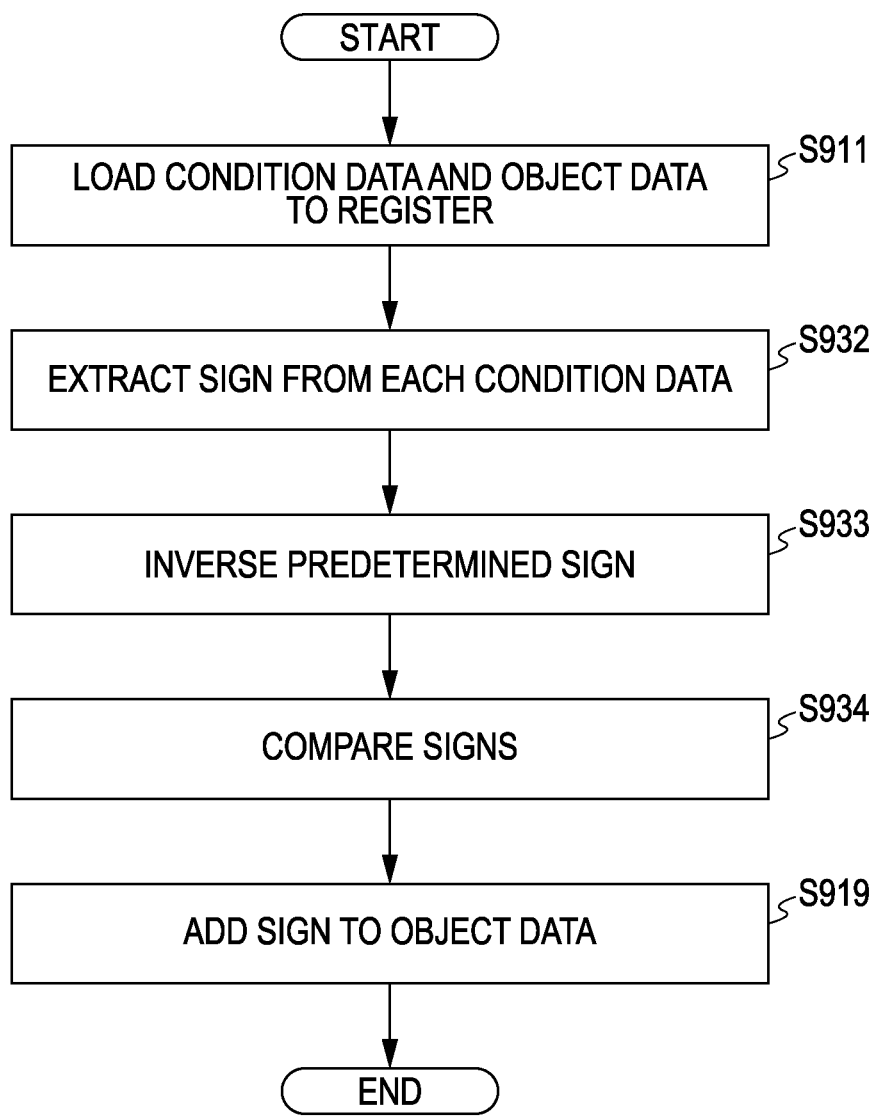
FIG. 21 is a flowchart illustrating exemplary steps in a sign addition process in the tenth exemplary configuration of the processor 100 according to the first embodiment of the invention.

FIG. 21 is a flowchart illustrating exemplary steps in a sign addition process in the tenth exemplary configuration of the processor 100 according to an embodiment of the invention.

First, the first condition data, the second condition data and the object data are loaded into the register 140 from the memory 120 (step S911). Next, the sign bit extraction section 260 extracts the sign bit from the first condition data and the sign bit extraction section 270 extracts the sign bit from the second condition data (Step S932). Next, the inverting section 230 inverts the sign bit extracted by the sign bit extraction section 260 (step S933). Next, the comparing section 280 generates the sign data on the basis of the sign bit inverted by the inverting section 230 and the sign bit extracted by the sign bit extraction section 270 (step S934). Subsequently, the sign adding section 300 adds the sign to the object data (step S919).

Accordingly, the processor 100 uses the AND operation circuit as the comparing section 280 in the sign data generating section 200 in order to add a sign to the object data if the first condition data is not smaller than "0" and the second condition data is smaller than "0."

The processor 100 uses the OR operation circuit as the comparing section 280 in place of the AND operation circuit, in order to add a sign to the object data if the first condition data is not smaller than "0" or the second condition data is smaller than "0."

According to the first embodiment of the invention, the sign of the condition-added floating-point type data can be converted at high speed by addition of the sign to floating-point type data through the integer arithmetic operation.

Although some modified embodiments regarding the sign data generating section 200 have been described in the first embodiment of the invention, various other modifications may be made through combinations of the arithmetic circuits other than those described.

2. Second Embodiment

Exemplary Configuration of Frame in MP3 Audio Data

In the second embodiment, an example in which an embodiment of the invention is applied to a specified application will be described.

Figure 22:
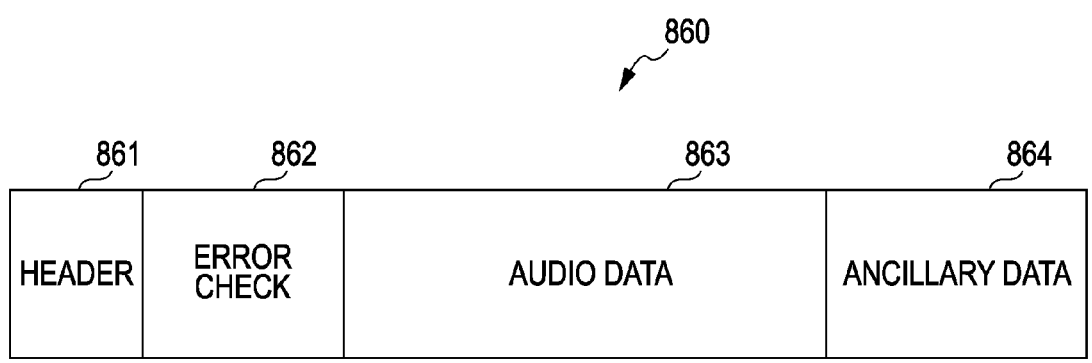
FIG. 22 is a schematic diagram illustrating a data structure of a frame in MP3 data, which is audio data compressed on the basis of an MP3 (Moving Picture Experts Group (MPEG)-1 audio layer-3) standard.

FIG. 22 is a schematic diagram illustrating a data structure of a frame in MP3 data which is audio data compressed on the basis of an MP3 (Moving Picture Experts Group (MPEG) 1 audio layer 3) standard. A frame 860 is the minimum unit for decoding MP3 data. The frame 860 includes a header 861, an error check 862, an audio data 863 and an ancillary data 864.

The header 861 is the data representing content of the frame. The header 861 is 32-bit data. The error check 862 is the data for detecting errors in the data of the frame through cyclic redundancy check. The error check 862 is 16-bit data. The error check 862 is the data for detecting errors and is thus not indispensable. The audio data 863 includes audio information. The audio data 863 includes bit assignment information, side information including Huffman table information, scale factor information and Huffman code data information. The ancillary data 864 is the data inserted if the audio data 863 does not reach an end of the frame.

Next, an exemplary configuration of the decoding device 900 which decodes the MP3 data will be described with reference to the drawings.

Exemplary Configuration of Decoding Device

Figure 23:
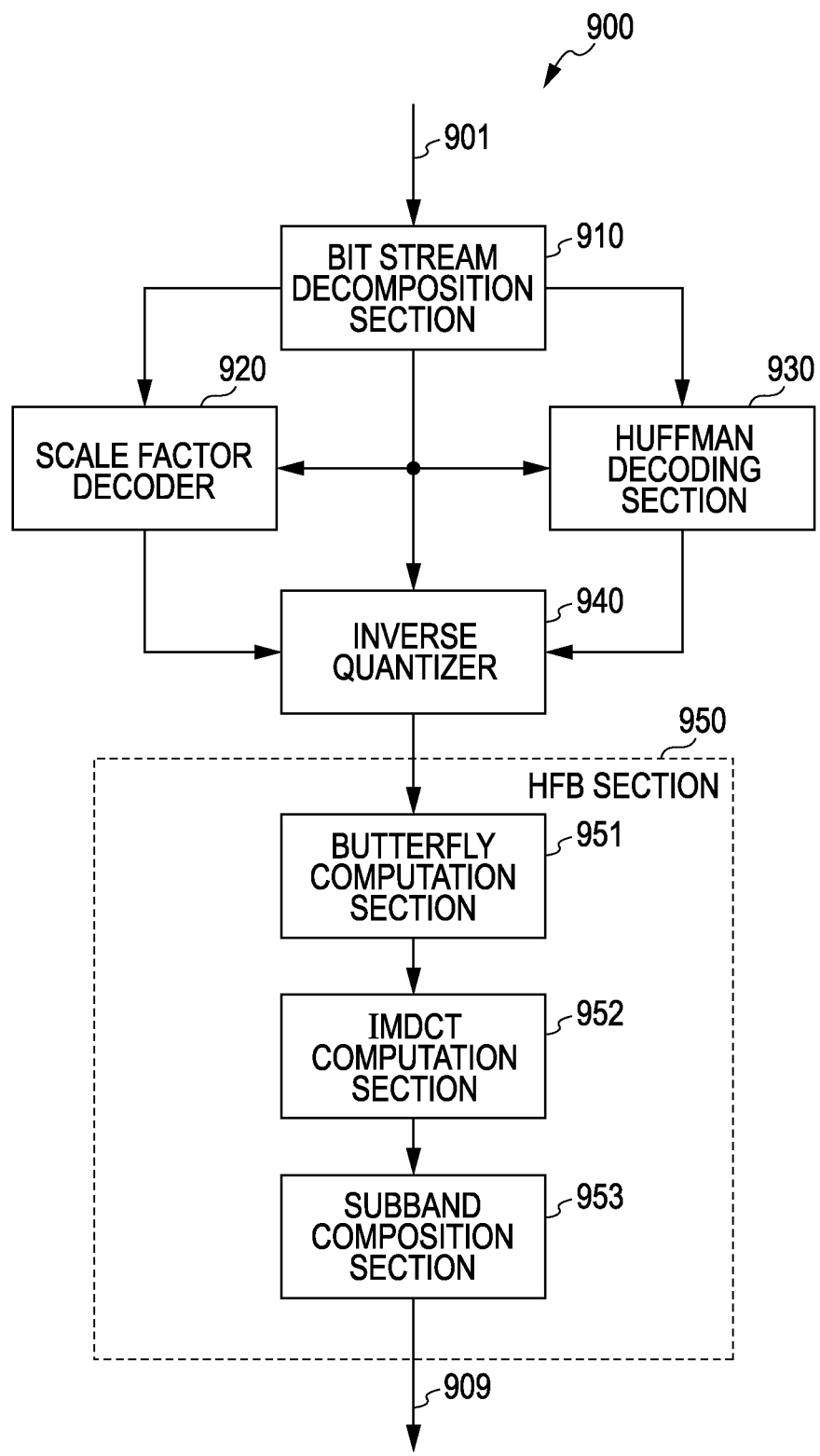
FIG. 23 is a block diagram illustrating an exemplary configuration of a decoding device 900 which decodes the MP3 data.

FIG. 23 is a block diagram illustrating an exemplary configuration of a decoding device 900 which decodes the MP3 data. The decoding device 900 decodes, from the MP3 data supplied via the signal line 901, the pulse code modulation (PCM) data which is the audio signals quantized to a certain step width and outputs the decoded data via the signal line 909. The decoding device 900 includes a bit stream decomposition section 910, a scale factor decoder 920, a Huffman decoding section 930, an inverse quantization section 940 and a hybrid filter bank (HFB) section 950.

The bit stream decomposition section 910 extracts, from the MP3 data supplied via the signal line 901, the bit assignment information, side information including the Huffman table information, the scale factor information and the Huffman code data information. The bit stream decomposition section 910 supplies the extracted bit assignment information to the scale factor decoder 920, the Huffman decoding section 930 and the inverse quantization section 940. The bit stream decomposition section 910 supplies the extracted side information including the Huffman table information and the bit assignment information to the scale factor decoder 920, the Huffman decoding section 930 and the inverse quantization section 940. The bit stream decomposition section 910 supplies the extracted scale factor information to the scale factor decoder 920. The bit stream decomposition section 910 supplies the extracted Huffman code data information to the Huffman decoding section 930.

The scale factor decoder 920 decodes the scale factor on the basis of the bit assignment information, the scale factor information and the side information including Huffman table information supplied from the bit stream decomposition section 910. The scale factor decoder 920 supplies the decoded scale factor to the inverse quantization section 940.

The Huffman decoding section 930 decodes the Huffman code data on the basis of the bit assignment information, the Huffman code data information and the side information including Huffman table information supplied from the bit stream decomposition section 910. The Huffman decoding section 930 supplies the decoded Huffman code data to the inverse quantization section 940.

The inverse quantization section 940 inverse-quantizes the Huffman code data on the basis of the bit assignment information, the side information including the Huffman table information, the scale factor and the Huffman code data, and generates inverse quantization data. The inverse quantization section 940 supplies the generated inverse quantization data to the HFB section 950.

The HFB section 950 restores the audio signals to PCM data on the basis of the inverse quantization data supplied from the inverse quantization section 940. The HFB section 950 includes a butterfly computation section 951, an inverse modified discrete cosine transform (IMDCT) computation section 952 and a subband composition section 953.

The butterfly computation section 951 removes aliasing through butterfly computation on the basis of the inverse quantization data supplied from the inverse quantization section 940. The butterfly computation section 951 supplies the aliasing-removed data to the IMDCT computation section 952.

The IMDCT computation section 952 converts the data in the frequency domain of the audio signal into the data in the time domain through the inverse modified discrete cosine transform (IMDCT) on the basis of the aliasing-removed data supplied from the butterfly computation section 951. The IMDCT computation section 952 supplies the converted data to the subband composition section 953.

The subband composition section 953 generates the PCM data through subband composition on the basis of the data in the time domain supplied from the IMDCT computation section 952. The subband composition section 953 outputs the generated PCM data to the signal line 909.

Next, an operation of the decoding device 900 which decodes the MP3 data will be described with reference to the drawings.

Exemplary Operation of Decoding Device

Figure 24:
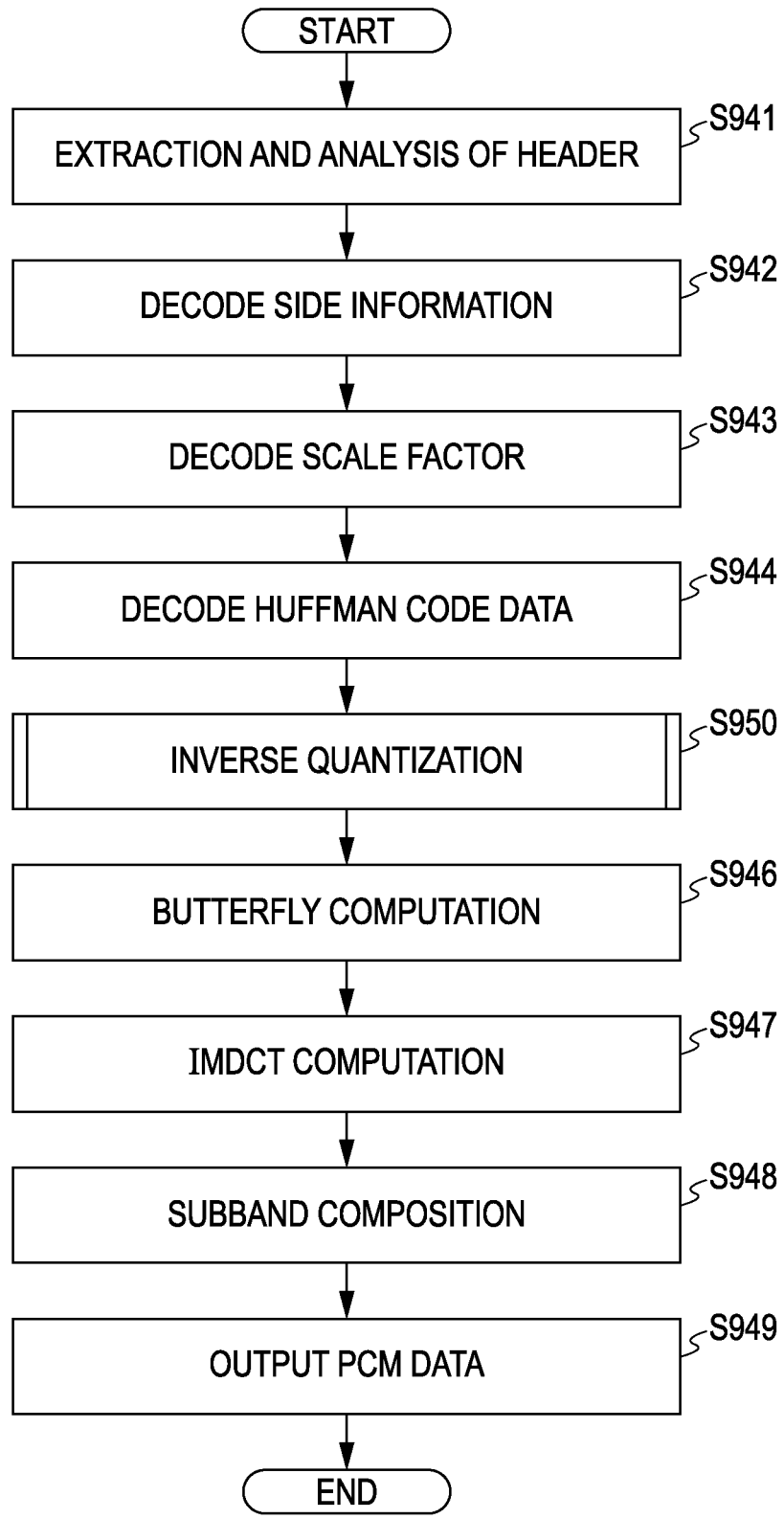
FIG. 24 is a flowchart illustrating exemplary steps in the decoding device 900 which decodes the MP3 data.

FIG. 24 is a flowchart illustrating exemplary steps of a decoding procedure in the decoding device 900 which decodes the MP3 data.

First, the bit stream decomposition section 910 extracts the header from the frame of the MP3 data supplied via the signal line 901 and analyzes the extracted header (step S941). Next, the bit stream decomposition section 910 decodes, on the basis of the analyzed header, the side information from the frame of the MP3 data and extracts the Huffman code data information and the scale factor information from the frame of the MP3 data (step S942). Next, the scale factor decoder 920 decodes the scale factor on the basis of the scale factor information from the bit stream decomposition section 910 (step S943). Next, the Huffman decoding section 930 decodes the Huffman code data on the basis of the Huffman code data information supplied from the bit stream decomposition section 910 (step S944). Next, the inverse quantization section 940 performs the inverse quantization process of the Huffman code data on the basis of side information, the scale factor and the Huffman code data, and thus generates inverse quantization data (step S950). The inverse quantization data is generated on the basis of the following Equation (2).

$$xr(i, j) = \text{sign}(is(i, j)) \times |is(i, j)|^{4/3} \times 2^P$$

$$0 \leq i \leq 31, \ 0 \leq j \leq 17 \tag{2}$$

wherein xr (i, j) is a calculating result of the inverse quantization process; is (i, j) is the Huffman code data; P is a constant calculated from the side information and the scale factor; sign (is (i, j)) is the sign of the Huffman code data; i is a subband bandwidth number; and j is a sample number of each subband output.

Next, on the basis of the inverse quantization data from the inverse quantization section 940, the butterfly computation section 951 performs the butterfly computation process and generates the aliasing-removed data (step S946). Next, the IMDCT computation section 952 converts the data in the frequency domain from the butterfly computation section 951 into the data in the time domain (step S947). Next, the subband composition section 953 converts the data in the time domain from the IMDCT computation section 952 into the PCM data (step S948). Next, the generated PCM data is supplied via the signal line 909 (step S949).

Next, the process of step S950 according to the present embodiment of the invention will be described with reference to the drawings.

Figure 25:
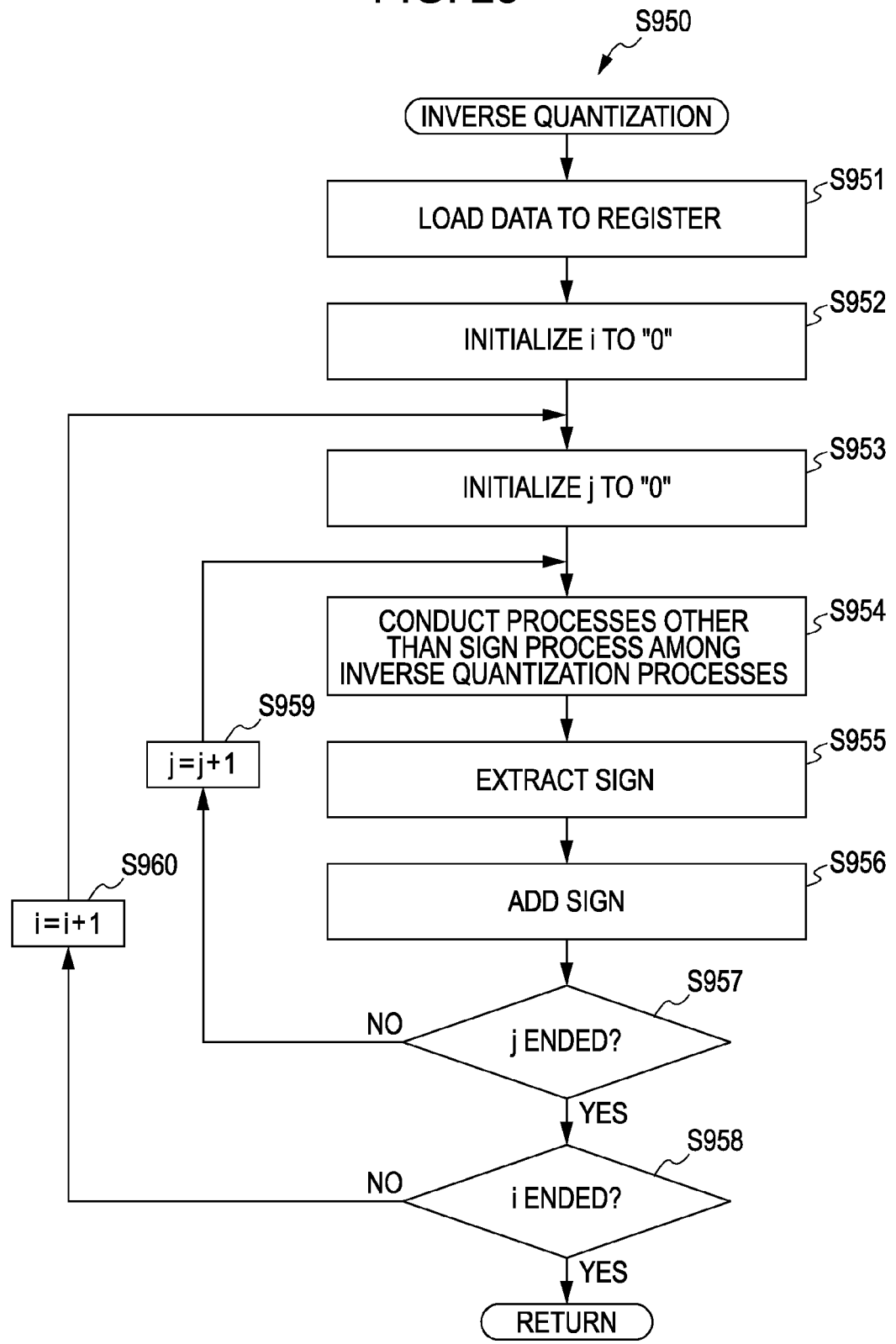
FIG. 25 is a flowchart illustrating exemplary steps in an inverse quantization process (step S950) by an inverse quantization section 940 according to the second embodiment of the invention.

FIG. 25 is a flowchart illustrating exemplary steps in an inverse quantization process (step S950) by an inverse quantization section 940 according to the second embodiment of the invention. Here, it is assumed that the inverse quantization process is performed by the processor 100 illustrated in FIG. 2.

First, the frame of the MP3 data is loaded from the memory 120 to the register 140 (step S951). Next, a loop control variable i of the inverse quantization process is initialized to "0" (step S952). Next, a loop control variable j of the inverse quantization process is initialized to "0" (step S953). Next, the processes other than the sign process among the inverse quantization processes with respect to the frame of the MP3 data are performed through the floating-point arithmetic operation (step S954). In step S954, the floating-point arithmetic operation is performed on the basis of the following Equation (3) as the processes other than the sign process in the inverse quantization process.

$$xr\_abs = |is(i,j)|^{4/3} \times 2^P \quad (3)$$

wherein xr_abs is a calculating result of the parts other than the sign in the inverse quantization process.

Next, the sign data generating section 200 extracts the sign bit of the floating-point number (step S955). Next, the sign adding section 300 adds the sign to the floating-point number calculated by the floating-point arithmetic operation (step S956).

Next, it is determined whether or not the loop control variable j is a predetermined threshold j (step S957). If the loop control variable j is smaller than the threshold j, "1" is added to the loop control variable j (step S959) and the routine returns to step S954 where the process is repeated. If the loop control variable j equals to the threshold j, it is determined whether or not a loop control variable i is the predetermined threshold j (step S958). If the loop control variable i is smaller than the threshold j, "1" is added to the loop control variable i (step S960) and the routine returns to step S953 where the process is repeated.

According to the second embodiment of the invention, the processor 100 can be applied to the inverse quantization arithmetic operation in the inverse quantization section 940.

3. Third Embodiment

Figure 26:
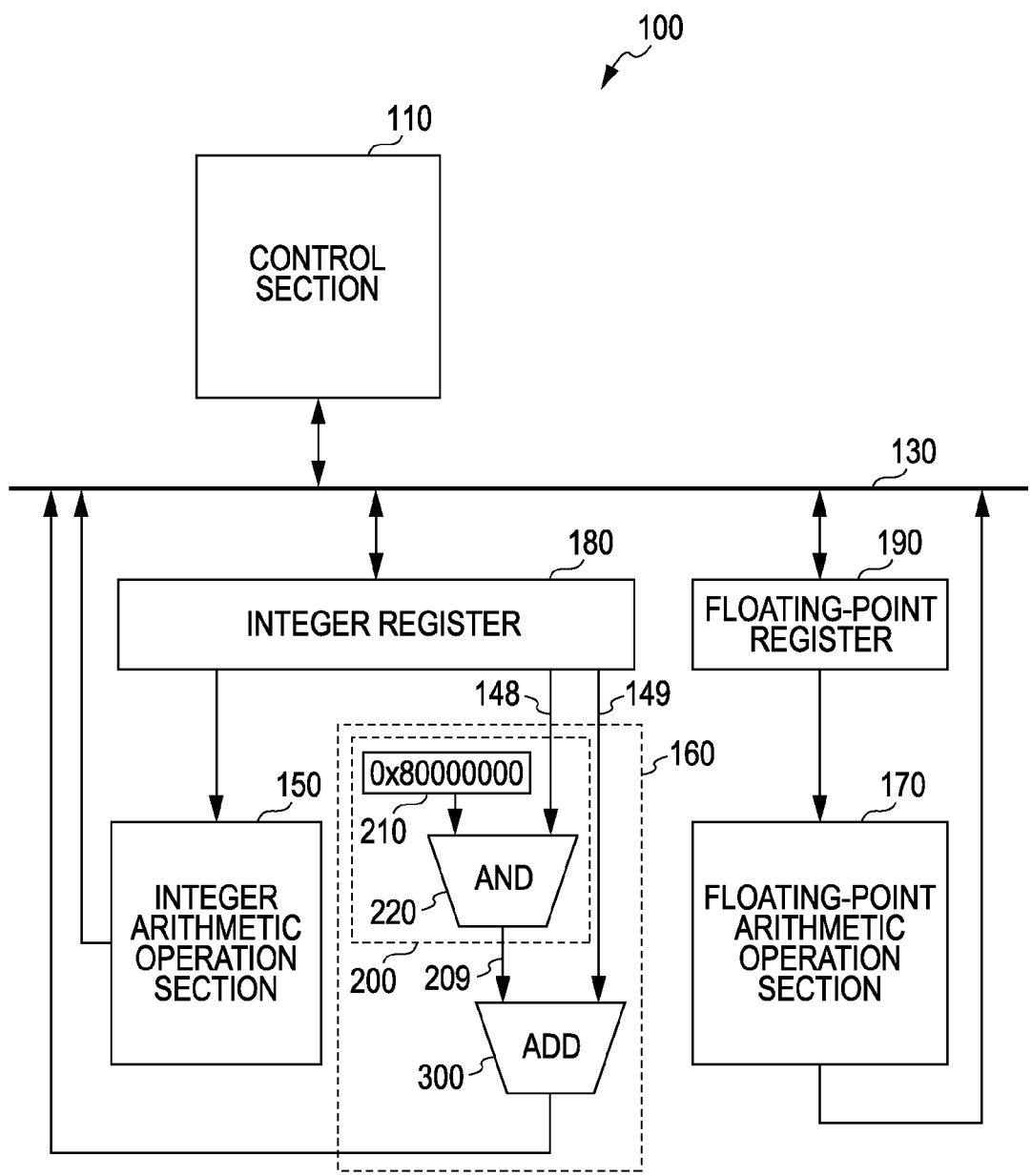
FIG. 26 is a block diagram illustrating an exemplary configuration of the processor 100 according to the third embodiment of the invention.

Exemplary Configuration of Processor Including Integer Register and Floating-point Register FIG. 26 is a block diagram illustrating an exemplary configuration of the processor 100 according to the third embodiment of the invention. Since the present processor 100 has the same configuration as that illustrated in FIG. 2 except for an integer register 180 and a floating-point register 190, similar components will be denoted by similar reference numerals and description thereof will be omitted.

The processor 100 illustrated in FIG. 26 includes the integer register 180 and the floating-point register 190 in place of the register 140 of the processor 100 illustrated in FIG. 2.

The integer register 180 temporarily keeps the data necessary for processes in the integer arithmetic operation section 150 and the sign determining section 160. The integer register 180 temporarily keeps, for example, the object data and the condition data to be processed in the sign determining section 160. The integer register 180 temporarily keeps the object data to be processed in the sign determining section 160 via the bus 130.

The integer register 180 supplies the object data processed in the sign determining section 160 to the floating-point register 190. The integer register 180 supplies the temporarily kept object data to the sign determining section 160 via the signal line 149. The integer register 180 supplies the temporarily kept condition data to the sign determining section 160 via the signal line 148.

The floating-point register 190 temporarily keeps the data necessary for the process in the floating-point arithmetic operation section 170 and the object data. The floating-point register 190 temporarily keeps, for example, the data necessary for the process in the floating-point arithmetic operation section 170 from the memory 120 supplied via the bus 130. The floating-point register 190 temporarily keeps the data regarding the result of the process in the floating-point arithmetic operation section 170. The floating-point register 190 supplies the temporarily kept object data to the integer register 180.

As described above, even if the processor 100 includes the integer register 180 and the floating-point register 190 provided separately, the sign can be added to the object data as illustrated in FIG. 2 on the basis of the object data, which is the condition data, and the floating-point type data, which is the integer type data.

Next, an operation of the processor 100 according to the third embodiment of the invention will be described with reference to the drawings.

Exemplary Operation of Processor

Figure 27:
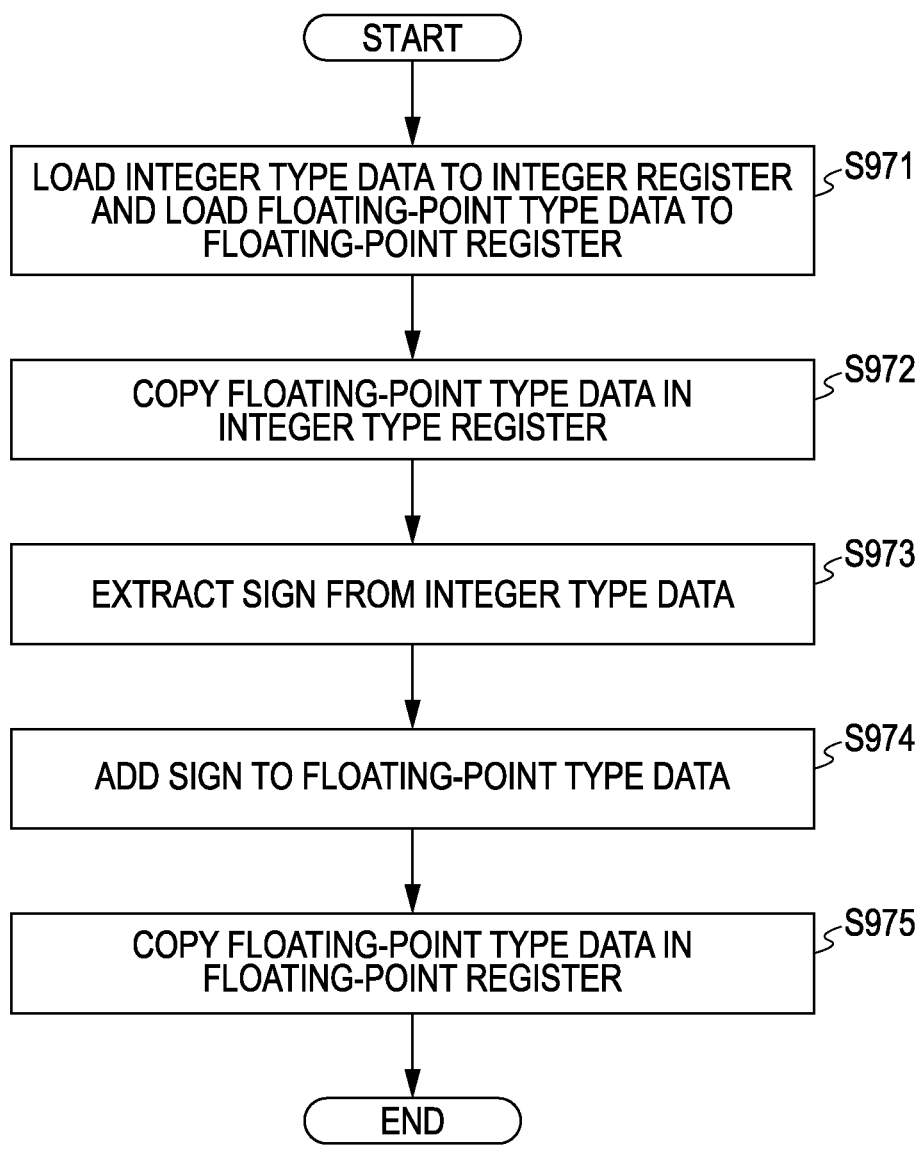
FIG. 27 is a flowchart illustrating exemplary steps of a sign addition process of the processor 100 according to the third embodiment of the invention.

FIG. 27 is a flowchart illustrating exemplary steps in a sign addition process of the processor 100 according to the third embodiment of the invention.

First, the condition data is loaded into the integer register 180 from the memory 120 and the object data is loaded into the floating-point register 190 from the memory 120 (step S971). Next, the object data is transmitted to the integer register 180 from the floating-point register 190 (step S972). Next, the bit string holding section 210 and the sign bit extraction section 220 extract the sign bit of the condition data (step S973). Next, the sign adding section 300 adds the sign to the object data (step S974). Next, the signed object data is transmitted to the floating-point register 190 from the integer register 180 (step S975).

As described above, according to the third embodiment of the invention, the sign can be added to the object data, which is the floating-point type data, through the integer arithmetic operation even if the integer register and the floating-point register are provided separately.

3. Fourth Embodiment

Exemplary Configuration of Compiling System

Figure 28:
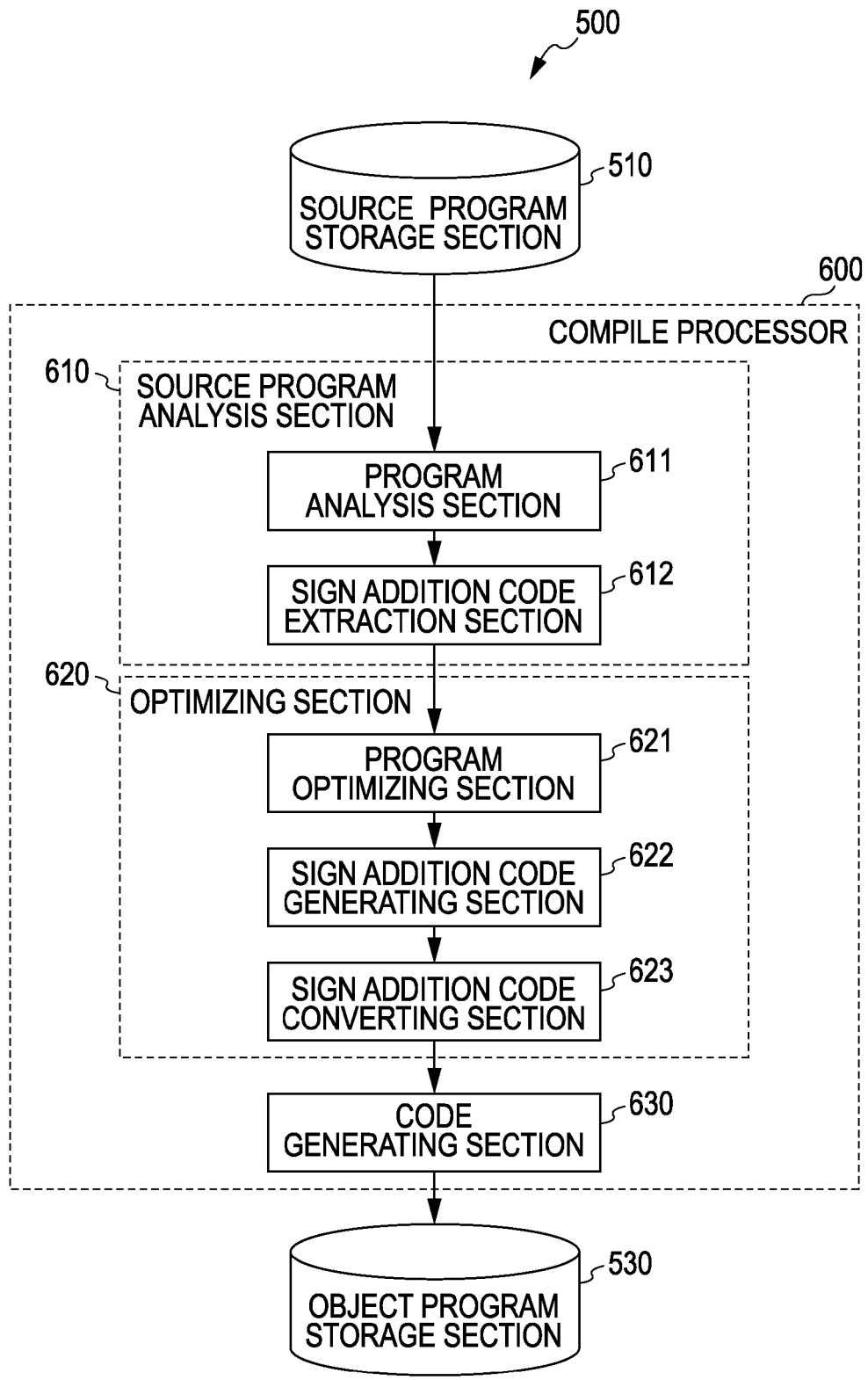
FIG. 28 is a block diagram illustrating an exemplary configuration of a compiling system 500 according to the fourth embodiment of the invention.

FIG. 28 is a block diagram illustrating an exemplary configuration of a compiling system 500 according to the fourth embodiment of the invention. A compiling system 500 compiles input programs and includes a source program storage section 510, a compiler 600 and an object program storage section 530.

The source program storage section 510 stores a source program to be compiled. The source program includes, for example, the code for adding the sign to the object data. The source program storage section 510 supplies the stored source program to the compiler 600. The source program storage section 510 is an exemplary source program storage section recited in the claims.

The compiler 600 generates the object program, which is the machine language program, by compiling the source program read out of the source program storage section 510. The compiler 600 supplies the generated object program to the object program storage section 530. The compiler 600 includes a source program analysis section 610, an optimizing section 620 and a code generating section 630.

The source program analysis section 610 conducts, for example, a morphological analysis and a syntactic analysis on the basis of the source program read out of the source program storage section 510. The source program analysis section 610 thus generates an intermediate code in a format called an intermediate expression code that is necessary for the process of the optimizing section 620. The source program analysis section 610 supplies the generated intermediate code to the optimizing section 620. The source program analysis section 610 includes the program analysis section 611 and the sign addition code extraction section 612.

The program analysis section 611 generates the intermediate code by conducting, for example, the morphological analysis and the syntactic analysis on the basis of the source program supplied from the source program storage section 510. The program analysis section 611 then supplies a code for generating the intermediate code to the sign addition code extraction section 612.

The sign addition code extraction section 612 extracts the code for adding the sign to the object data among the codes supplied from the program analysis section 611 and generates the intermediate code. The sign addition code extraction section 612 supplies the generated intermediate code to the optimizing section 620. The sign addition code extraction section 612 is an exemplary sign addition code extraction section recited in the claims.

The optimizing section 620 performs program optimization on the basis of the intermediate code supplied from the sign addition code extraction section 612. The program optimization includes optimization for improvement in execution speed and optimization for reduction of code size. The optimizing section 620 supplies the optimized program to the code generating section 630. The optimizing section 620 includes a program optimizing section 621, a sign addition code generating section 622 and a sign addition code converting section 623.

The program optimizing section 621 optimizes the program on the basis of the intermediate code supplied from the sign addition code extraction section 612. The program optimizing section 621 supplies the optimized program to the sign addition code generating section 622.

The sign addition code generating section 622 generates the code to be converted into the code extracted in the sign addition code converting section 623 on the basis of the code extracted by the sign addition code extraction section 612. The code to be converted is, for example, the code for implementing the arithmetic operation of the sign data generating section 200 illustrated in FIG. 2 with the assembly language and the code for implementing the arithmetic operation of the sign adding section 300 illustrated in FIG. 2 with the assembly language. That is, the code for implementing the arithmetic of the sign data generating section 200 illustrated in FIG. 2 with the assembly language is the code for generating the sign data for adding the sign to the object data on the basis of the condition obtained by extracting the condition included in the condition data. The code for implementing the arithmetic of the sign adding section 300 illustrated in FIG. 2 with the assembly language is the code for adding the sign to the object data on the basis of the sign data and the object data through the integer arithmetic operation using the object data as the integer type data. The sign addition code generating section 622 supplies the generated code to the sign addition code converting section 623 with the program for optimization has been started. The sign addition code generating section 622 is an exemplary sign addition code generating section recited in the claims.

The sign addition code converting section 623 converts the code extracted by the sign addition code extraction section 612 into the code generated by the sign addition code generating section 622. The sign addition code converting section 623 supplies the optimized program including the converted code to the code generating section 630. The sign addition code converting section 623 is an exemplary sign addition code converting section recited in the claims.

The code generating section 630 generates the object program, which is the code of the machine language program, on the basis of the optimized program supplied from the sign addition code converting section 623. The code generating section 630 supplies the generated object program to the object program storage section 530. The code generating section 630 is an exemplary code generating section recited in the claims.

The object program storage section 530 stores the object program supplied from the code generating section 630.

An exemplary C language code (4) converted by the compiler 600 will be described below.

```
int  a;
float b,c;
a=-4;
b=5.0f;
c=b;
if(a<0){
    c=-b;
}
```

The above code is converted by, for example, the compiler 600 into a C language code represented by the following code (5).

```
int  a,tmp;
union{
    float f;
    int i;
}b,c;
a=-4;
b.f=5.0f;
tmp=a&0x80000000;
c.i=b.i+tmp;
```

For example, when operation speed is measured using a "MIPS R4000" system, the code (4) is converted into the code (5) and thus the number of the cycles becomes "3" from "7", which corresponds to 57% improvement.

As described above, according to the compiler 600, the code for adding the sign to the object data through conditional branch and floating-point arithmetic operation can be converted into the code for adding the sign through integer arithmetic operation by compiling the source program.

Although the compiler 600 described above changes the sign addition code automatically, an instruction receiving section may alternatively be provided to externally control the sign addition code extraction section 612, the sign addition code generating section 622 and the sign addition code converting section 623.

Next, the process of the compiler 600 according to the present embodiment of the invention will be described with reference to the drawings.

Figure 29:
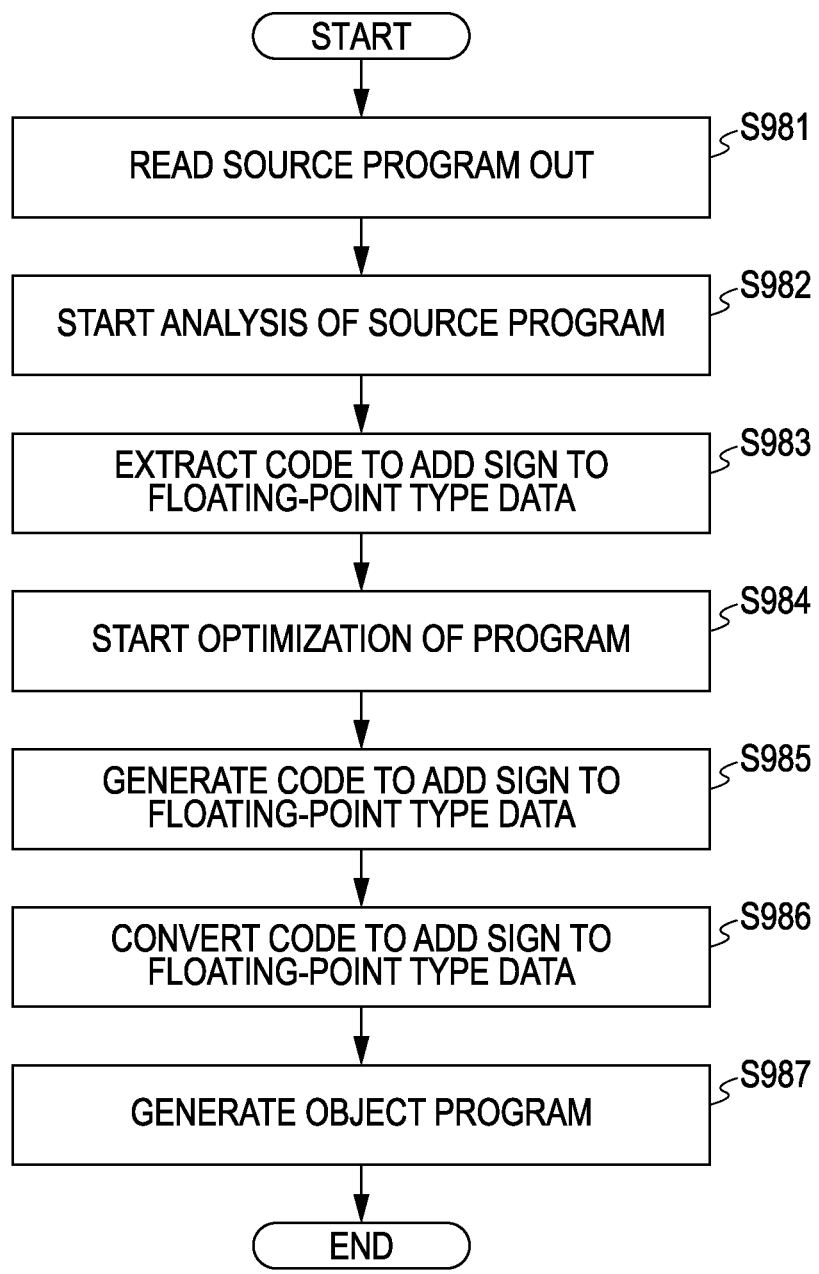
FIG. 29 is a flowchart illustrating steps in a compile process by a compiler 600 according to the fourth embodiment of the invention.

FIG. 29 is a flowchart illustrating steps in a compile process by a compiler 600 according to the fourth embodiment of the invention.

First, the compiler 600 reads the source program out of the source program storage section 510 (step S981). Next, the program analysis section 611 starts an analysis of the program (step S982). Next, the sign addition code extraction section 612 extracts the code for adding the sign on the basis of the object data and the condition data (step S983). Note that step S983 is an exemplary sign addition code extraction step recited in the claims. The program optimizing section 621 then starts program optimization (step S984). The sign addition code generating section 622 then generates the code for implementing the arithmetic of the sign data generating section 200 illustrated in FIG. 2 with the assembly language and the code for implementing the arithmetic of the sign adding section 300 illustrated in FIG. 2 with the assembly language (step S985). Note that step S985 is an exemplary sign addition code generation step recited in the claims. Next, the sign addition code converting section converts the code extracted by the sign addition code extraction section 612 into the code generated by the sign addition code generating section 622 (step S986). Note that step S986 is an exemplary sign addition code conversion step recited in the claims. Next, the code generating section 630 generates the object program, which is the code of the machine language program, on the basis of the program including the converted code (step S987). Note that step S987 is an exemplary code generation step recited in the claims.

As described above, according to the fourth embodiment of the invention, the code for adding the sign to the object data through conditional branch and the floating-point arithmetic operation can be automatically converted into the code for adding the sign through the integer arithmetic operation.

The embodiments of the invention are illustrative only and each of which corresponds to the matter to define the invention recited in the claims. However, the invention is not limited to embodiments described above and various modifications can be made without departing from a scope and spirit of the invention.

The procedures described in the embodiments of the invention may be considered as methods with a series of steps, or may be considered as a program or a recording medium that stores the program for making the computer execute these steps. Examples of the recording media include a compact disc (CD), a minidisc (MD) a digital versatile disc (DVD), a memory card and the Blu-ray Disc (registered trademark).

The present application contains subject matter related to that disclosed in Japanese Priority Patent Application JP 2009-003018 filed in the Japan Patent Office on Jan. 9, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A circuit comprising:
   one or more processors operable to:
   receive floating-point type object data to which a sign, which represents a negative or positive value, is to be added and condition data comprising a condition based on which the sign is added;
   extract the condition included in the condition data;
   generate sign data for adding the sign to the floating-point type object data based on the extracted condition;
   align positions of the sign in the sign data and a sign in the floating-point type object data with each other when the condition data and the floating-point type object data have different bit lengths;
   and perform an integer arithmetic operation while the floating-point type object data is being treated as integer-type data to add the sign in the sign data to the floating-point type object data based on the sign data, wherein the positions of the sign in the sign data and the sign in the floating-point type object data are aligned with each other by shifting a sign bit extracted from the condition data, and wherein a number of bits by which the sign bit is shifted is based on a bit length of the condition data and a bit length of the floating-point type object data, wherein the one or more processors perform inverse quantization when decoding Moving Pictures Experts Group (MPEG) 1 audio layer 3 (MP3) data.

2. The circuit according to claim 1, wherein the one or more processors perform the integer arithmetic operation while the condition data is being treated as the integer-type data in a case where the condition data is floating-point type data.

3. The circuit according to claim 1, wherein the one or more processors extract the condition from the condition data using a bit string.

4. The circuit according to claim 1, wherein the one or more processors:
   generate new condition data based on a plurality of pieces of the condition data; extract a new condition included in the new condition data;
   and generate the sign data based on the extracted new condition data.

5. The circuit according to claim 4, wherein the one or more processors:
   extract a plurality of conditions included in the plurality of pieces of the condition data and generate the sign data based at least on the plurality of conditions.

6. The circuit according to claim 1, wherein the one or more processors: supply a bit string as the sign data irrespective of a value of the condition data; and invert the sign of the floating-point type object data based on the sign data.

7. The circuit according to claim wherein the one or more processors: generate the sign data based on the sign bit.

8. The circuit according to claim 7, wherein the one or more processors: extract the sign bit representing the sign in the condition data as the condition; invert the sign of the extracted sign hit to generate a new sign bit; and generate the sign data based at least on the new sign bit.

9. A circuit comprising:
   a register operable to supply floating-point type object data to which a sign, which represents a negative or positive value, is to be added and condition data comprising a condition based on which the sign is added;
   and one or more processors to:
   extract the condition included in the condition data;
   and generate sign data for adding the sign to the floating-point type object data based on the extracted condition;
   align positions of the sign in the sign data and a sign in the floating-point type object data with each other when the condition data and the floating-point, type object data have bit lengths different from each other;
   and perform an integer arithmetic operation while the floating-point type object data is being treated as integer type data to add the sign in the sign data to the floating-point type object data based on the sign data,
   wherein the positions of the sign in the sign data and the sign in the floating-point type object data are aligned with each other by shifting a sign bit extracted from the condition data, and wherein a number of bits by which the sign bit is shifted is based on a bit length of the condition data and a bit length of the floating-point type object data, wherein the one or more processors perform inverse quantization when decoding Moving Pictures Experts Group (MPEG) 1 audio layer 3 (MP3) data.

10. A device comprising one or more processors for executing a compiler, the device comprising:
a memory to store a source program comprising a code for adding a sign, which represents a negative or positive value, to floating-point type object data based on the floating-point type object data and condition data comprising a condition based on which the sign is added, wherein the one or more processors:
read the source program;
extract the code from the source program;
generate a code for extracting the condition included in the condition data;
generate sign data for adding the sign to the floating-point type object data based on the extracted condition;
align positions of the sign in the sign data and a sign in the floating-point type object data with each other when the condition data and the floating-point type object data have different bit lengths,
wherein the positions of the sign in the sign data and the sign in the floating-point type object data are aligned with each other by shifting a sign hit extracted from the condition data, and wherein a number of bits by which the sign bit is shifted is based on a bit length of the condition data and a bit length of the floating-point type object data;
generate a code for performing an integer arithmetic operation while the floating-point type object data is being treated as integer type data;
and add the sign in the sign data to the floating-point type object data based on the sign data,
wherein the one or more processors perform inverse quantization when decoding Moving Pictures Experts Group (MPEG) 1 audio layer 3 (MP3) data.

11. A method of compiling in a computer storing a source program comprising a code, the method comprising:
the code, when executed by one or more processors, adding a sign, which represents a negative or positive value, to floating-point type object data based on the floating-point type object data and condition data comprising a condition based on which the sign is added:
extracting the code from the source program;
generating a code for extracting the condition included in the condition data;
generating sign data for adding the sign to the floating-point type object data based on the extracted condition;
aligning positions of the sign in the sign data and a sign in the floating-point type object data with each other when the condition data and the floating-point type object data have different bit lengths,
wherein the positions of the sign in the sign data and the sign in the floating-point type object data are aligned with each other by shifting a sign bit extracted from the condition data, and wherein a number of bits by which the sign bit is shifted is based on a bit length of the condition data and a bit length of the floating-point type object data;
generate a code for performing an integer arithmetic operation while the floating-point type object data is being treated as integer type data;
and add the sign in the sign data to the floating-point type object data based on the sign data, wherein the one or more processors perform inverse quantization when decoding Moving Pictures Experts Group (MPEG) 1 audio layer 3 (MP3) data.

12. The circuit according to claim 1, wherein the one or more processors:
extract a sign bit based on a logical product arithmetic operation of the condition data and a bit string;
and generate the sign data based on the sign bit.

13. The circuit according to claim 1 wherein the one or more processors:
extract a sign bit based on a logical product arithmetic operation of the condition data and a bit string;
and invert the sign hit based on an arithmetic addition operation of the sign hit and the hit string.

14. The circuit according to claim 1, wherein the one or more processors:
extract the condition from the condition data using a bit string;
and generate the sign data based on the bit string.

* * * * *